United States Patent
Tsuda et al.

(10) Patent No.: US 10,764,825 B2
(45) Date of Patent: Sep. 1, 2020

(54) WIRELESS TELECOMMUNICATIONS SYSTEM

(71) Applicant: SONY CORPORATION, Tokyo (JP)

(72) Inventors: Shinichiro Tsuda, Basingstoke (GB); Dimitris Koulakiotis, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 2 days.

(21) Appl. No.: 15/752,053

(22) PCT Filed: Sep. 8, 2016

(86) PCT No.: PCT/EP2016/071182
§ 371 (c)(1),
(2) Date: Feb. 12, 2018

(87) PCT Pub. No.: WO2017/050586
PCT Pub. Date: Mar. 30, 2017

(65) Prior Publication Data
US 2018/0234919 A1   Aug. 16, 2018

(30) Foreign Application Priority Data

Sep. 25, 2015   (EP) ..................................... 15186949

(51) Int. Cl.
*H04W 52/02* (2009.01)
*H04W 8/00* (2009.01)
(Continued)

(52) U.S. Cl.
CPC ....... *H04W 52/0219* (2013.01); *H04W 8/005* (2013.01); *H04W 52/0216* (2013.01);
(Continued)

(58) Field of Classification Search
None
See application file for complete search history.

(56) References Cited

U.S. PATENT DOCUMENTS 8,126,483 B2 * 2/2012 Lee ...................... H04W 68/00
455/458
9,253,798 B2 * 2/2016 Pani ....................... H04W 4/70
(Continued)

FOREIGN PATENT DOCUMENTS

WO   WO 2014/058221 A2   4/2014
WO   WO 2014/058221 A3   4/2014
(Continued)

OTHER PUBLICATIONS

International Search Report dated Nov. 25, 2016 in PCT/EP2016/071182, filed Sep. 8, 2016.
(Continued)

*Primary Examiner* — Bunjob Jaroenchonwanit
(74) *Attorney, Agent, or Firm* — Xsensus LLP

(57) ABSTRACT

A wireless telecommunications system including first and second groups of terminal devices operable to communicate with a base station via respective first and second network nodes. Each of the first and second groups of terminal devices are synchronized to communicate with the first and second network nodes, respectively, in a discontinuous mode including a repeating signalling cycle including first and second wake periods. The first wake period is a first portion of the repeating signalling cycle and the start of the first wake period is defined by a first offset value relative to the start of the repeating signalling cycle. The second wake period is a second portion of the repeating signalling cycle and the start of the second wake period is defined by a second offset value relative to the start of the repeating signalling cycle, being different from the first offset value.

17 Claims, 10 Drawing Sheets

(51) Int. Cl.
*H04W 88/04* (2009.01)
*H04W 74/08* (2009.01)
*H04W 76/20* (2018.01)

(52) U.S. Cl.
CPC ....... *H04W 74/0891* (2013.01); *H04W 76/20* (2018.02); *H04W 88/04* (2013.01); *Y02D 70/1242* (2018.01); *Y02D 70/1262* (2018.01); *Y02D 70/21* (2018.01); *Y02D 70/24* (2018.01)

(56) References Cited

U.S. PATENT DOCUMENTS

| | | | |
|---|---|---|---|
| 2008/0232293 A1* | 9/2008 | Mooney | H04W 68/025 370/312 |
| 2010/0208660 A1* | 8/2010 | Ji | H04W 52/0225 370/328 |
| 2012/0040700 A1* | 2/2012 | Gomes | H04W 4/08 455/500 |
| 2013/0115977 A1* | 5/2013 | Chandramouli | H04W 4/70 455/458 |
| 2013/0137432 A1* | 5/2013 | Wong | H04W 36/00 455/436 |
| 2013/0176890 A1* | 7/2013 | Sharma | H04B 7/15557 370/252 |
| 2013/0229959 A1* | 9/2013 | Ghosh | H04W 74/08 370/311 |
| 2013/0286957 A1* | 10/2013 | Bucknell | H04W 4/70 370/329 |
| 2014/0003234 A1* | 1/2014 | Chou | H04W 4/70 370/230 |
| 2014/0071957 A1* | 3/2014 | Xu | H04W 4/70 370/336 |
| 2014/0126458 A1* | 5/2014 | Cho | H04L 12/189 370/312 |
| 2014/0248915 A1* | 9/2014 | Chandramouli | H04W 4/70 455/458 |
| 2014/0334365 A1* | 11/2014 | Jafarian | H04W 52/0225 370/311 |
| 2015/0181521 A1* | 6/2015 | Kwon | H04W 52/0216 370/311 |
| 2015/0282132 A1* | 10/2015 | Kim | H04W 8/005 370/329 |
| 2015/0282143 A1* | 10/2015 | Kim | H04W 8/005 370/329 |
| 2015/0382315 A1* | 12/2015 | Sorrentino | H04W 76/14 370/329 |
| 2016/0119956 A1* | 4/2016 | Kim | H04W 76/27 370/329 |
| 2018/0049123 A1* | 2/2018 | Park | H04W 68/02 |
| 2018/0176810 A1* | 6/2018 | Thangarasa | H04W 76/11 |
| 2018/0184445 A1* | 6/2018 | Larmo | H04W 52/0216 |

FOREIGN PATENT DOCUMENTS

| | | |
|---|---|---|
| WO | WO 2015/110228 A1 | 7/2015 |
| WO | WO 2015/113689 A1 | 8/2015 |
| WO | WO 2015/113690 A1 | 8/2015 |
| WO | WO 2015/113696 A1 | 8/2015 |
| WO | WO 2015/113719 A1 | 8/2015 |
| WO | WO 2015/113720 A1 | 8/2015 |
| WO | WO 2016/128213 A1 | 8/2016 |
| WO | WO 2016/128277 A1 | 8/2016 |

OTHER PUBLICATIONS

Harri Holma, et al., "LTE for UMTS OFDMA and SC-FDMA Based Radio Access" Wiley, 2009, 4 Pages.

Qualcomm Incorporated, "RAN enhancements for extended DRX in LTE" 3GPP TSG RAN Meeting #67, RP-150493, Mar. 2015, 7 Pages.

"3rd Generation Partnership Project; Technical Specification Group Radio Access Network; Evolved Universal Terrestrial Radio Access (E-UTRA); Medium Access Control (MAC) protocol specification (Release 12)" 3GPP TS 36.321 V12.6.0, Jun. 2015, pp. 1-77.

"3rd Generation Partnership Project; Technical Specification Group RAN; Study on LTE Device to Device Proximity Services-Radio Aspects; (Release 12)" 3GPP TR 36.843 V1.0.0, Nov. 2013, pp. 1-32.

Vodafone, "Study on Provision of low-cost MTC UEs based on LTE" TSG RAN meeting #57, RP-121441, Sep. 2012, 6 Pages.

Vodafone, "Low cost & enhanced coverage MTC UE for LTE—Performance part" 3GPP TSG RAN meeting #60, RP-130848, Jun. 2013, 5 Pages.

"3rd Generation Partnership Project; Technical Specification Group Radio Access Network; Study on provision of low-cost MTC UEs based on LTE; (Release 12)" 3GPP TR 36.888 V2.1.1, Jun. 2013, 54 Pages.

\* cited by examiner

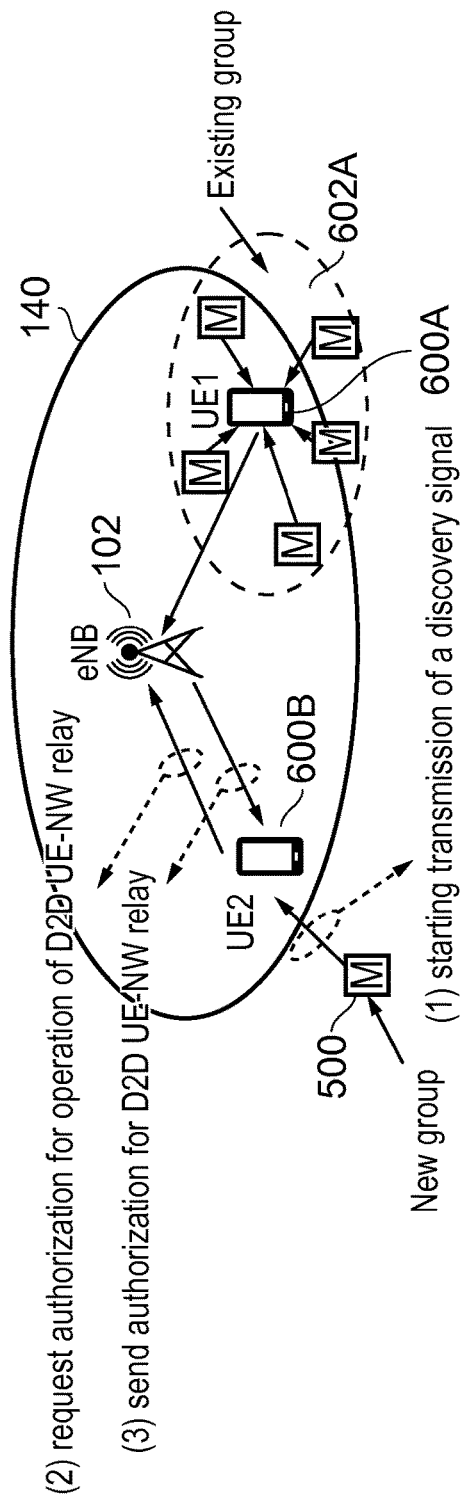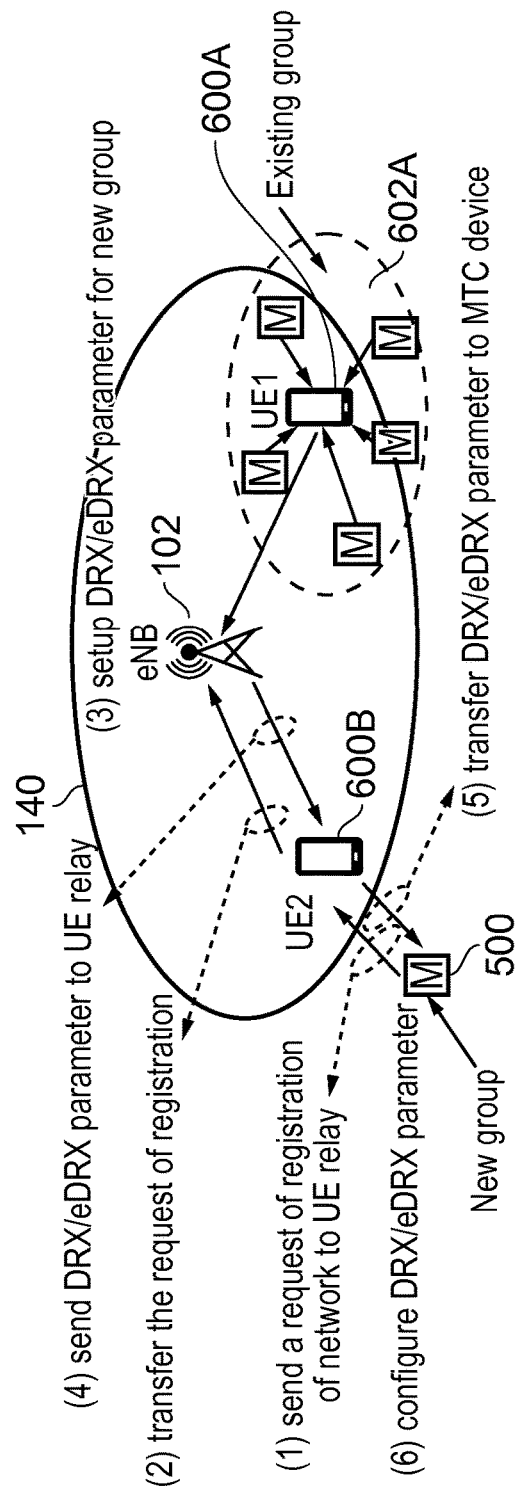

WIRELESS TELECOMMUNICATIONS SYSTEM

CROSS-REFERENCE TO RELATED APPLICATIONS

The present application is based on PCT filing PCT/EP2016/071182 filed Sep. 8, 2016, and claims priority to European Patent Application 15 186 949.2, filed in the European Patent Office on Sep. 25, 2015, the entire contents of each of which being incorporated herein by reference.

TECHNICAL FIELD OF THE DISCLOSURE

The present disclosure relates to a wireless telecommunications system.

BACKGROUND OF THE DISCLOSURE

Mobile communications system (or wireless telecommunications system) such as those which are being developed in accordance with the Long Term Evolution (LTE) project by the Third Generation Project Partnership (3GPP) can provide a facility for communications devices to transmit or receive data for a variety of applications with high data rates within a radio coverage area provided by a mobile communications network. A wireless access interface provided by the mobile communications network configured in accordance with an LTE standard includes signal transmission techniques which can support these high data rates. There is therefore expected to be a variety of applications, which can be supported by an LTE system.

Although there are applications which require high data rates to support their operation, there are some applications in which high data rates are not required. Indeed there are some applications which are expected to be provided by more simple, less complicated communications devices such as those supporting machine type communications (MTC). Such devices are also expected to be low power devices and may include a relatively inexpensive low complexity, narrowband, transmitter and receiver. Such devices may also be deployed in locations in which radio communications conditions can make transmission and reception of signals more difficult.

The low cost and low power characteristic of MTC devices, together with their wide and varied potential applications, means that there are likely to be large numbers of them distributed over a wireless telecommunications network. Problems therefore arise in trying to efficiently manage the data transmitted to and from such a large number of devices on the network. There are also continued problems in trying to decrease the power consumption of MTC devices. The present technique aims to alleviate these problems.

SUMMARY OF THE DISCLOSURE

In a first aspect, the present technique provides a wireless telecommunications system comprising a plurality of terminal devices operable to communicate with a base station via respective network nodes, wherein the plurality of terminal devices comprises a first group of terminal devices operable to communicate with the base station via a first network node and a second group of terminal devices operable to communicate with the base station via a second network node, wherein each of the first and second groups of terminal devices are synchronised to communicate with the first and second network nodes, respectively, in a discontinuous mode comprising a repeating signalling cycle, the repeating signalling cycle comprising a first wake period and a second wake period; wherein: the first wake period is a first portion of the repeating signalling cycle and the start of the first wake period is defined by a first offset value relative to the start of the repeating signalling cycle; the second wake period is a second portion of the repeating signalling cycle and the start of the second wake period is defined by a second offset value relative to the start of the repeating signalling cycle, the second offset value being different to the first offset value; each terminal device in the first group of terminal devices is operable to exchange predetermined signalling with the first network node during the first wake period of the repeating signalling cycle, and to not exchange the predetermined signalling with the first network node during a portion of the repeating signalling cycle other than the first wake period; and each terminal device in the second group of terminal devices is operable to exchange predetermined signalling with the second network node during the second wake period of the repeating signalling cycle, and to not exchange the predetermined signalling with the second network node during a portion of the repeating signalling cycle other than the second wake period.

In an embodiment, the discontinuous mode of the first group of terminal devices is one of an idle mode or a connected mode, wherein in the idle mode, the predetermined signalling comprises a control signal for controlling a terminal device of the first group of terminal devices to enter the connected mode, and wherein in the connected mode, the predetermined signalling comprises a scheduling signal for scheduling radio resources for use by a terminal device of the first group of terminal devices; and the discontinuous mode of the second group of terminal devices is one of an idle mode or a connected mode, wherein in the idle mode, the predetermined signalling comprises a control signal for controlling a terminal device of the second group of terminal devices to enter the connected mode, and wherein in the connected mode, the predetermined signalling comprises a scheduling signal for scheduling radio resources for use by a terminal device of the second group of terminal devices.

In an embodiment, the base station is operable to store an identifier of the group that each terminal device in the first and second groups of terminal devices belongs to and to transmit a control signal to a terminal device for controlling the terminal device to enter the connected mode via the network node associated with the group to which the terminal device belongs, the control signal being transmitted to the network node associated with the group to which the terminal device belongs on the basis of the stored identifier of the group to which the terminal device belongs.

In an embodiment, the network node is a relay node.

In an embodiment, the network node is a small base station.

In a second aspect, the present technique provides a terminal device for use with a wireless telecommunications system according to the first aspect, the terminal device comprising: a transceiver operable to exchange signalling with the base station via one of the first and second network nodes; and a controller operable to: select one of the first and second groups of terminal devices; if the first group of terminal devices is selected, control the transceiver to exchange signalling with the base station via the first network node, the controller controlling the transceiver to exchange the predetermined signalling with the first network node during the first wake period of the repeating signalling cycle; and if the second group of terminal devices is selected, control the transceiver to exchange signalling with the base station via the second network node, the controller controlling the transceiver to exchange the predetermined signalling with the second network node during the second wake period of the repeating signalling cycle.

In an embodiment, the terminal device comprises a storage medium storing information indicative of which of the first and second groups of terminal devices is to be selected, and wherein the controller is operable to select the one of the first and second groups of terminal devices in accordance with the one of the first and second groups of terminal devices indicated by the information stored in the storage medium.

In an embodiment, the terminal device is the only terminal device in the selected one of the first and second groups of terminal devices, and wherein: the transceiver is operable to receive direct signalling from the base station; the controller is operable to measure a signal characteristic of direct signalling from the base station received at the transceiver; if the measured signal characteristic is greater than or equal to a threshold, then the controller is operable to: control the transceiver to directly transmit a registration request message to the base station, the registration request message comprising a request for information indicative of the network node, the repeating signalling cycle, and the one of the first and second wake periods associated with the selected one of the first and second groups of terminal devices, control the transceiver to directly receive an information message indicative of the network node, the repeating signalling cycle, and the one of the first and second wake periods associated with the selected one of the first and second groups of terminal devices from the base station, and control the transceiver to exchange signalling with the base station via the network node indicated by the received information message, and control the transceiver to exchange the predetermined signalling with the network node indicated by the received information message using the repeating signalling cycle and the one of the first and second wake periods indicated by the received information message; and if the measured signal characteristic is less than the threshold, then the controller is operable to: control the transceiver to transmit a device to device (D2D) discovery signal for the establishment of a network node to be associated with the selected one of the first and second groups of terminal devices and via which the transceiver is operable to exchange signalling with the base station; control the transceiver to transmit a registration request message to the base station via the established network node, the registration request message comprising a request for information indicative of the repeating signalling cycle and the one of the first and second wake periods associated with the selected one of the first and second groups of terminal devices, control the transceiver to receive an information message indicative of the repeating signalling cycle and the one of the first and second wake periods associated with the selected one of the first and second groups of terminal devices from the base station via the established network node, and control the transceiver to exchange signalling with the base station via the established network node, and control the transceiver to exchange the predetermined signalling with the established network node using the repeating signalling cycle and the one of the first and second wake periods indicated by the received information message.

In an embodiment, the selected one of the first and second groups of terminal devices comprises at least one other terminal device, and wherein: the transceiver is operable to receive direct signalling from at least one of the base station and the network node associated with the selected one of the first and second groups of terminal devices, the direct signalling comprising an information message indicative of the network node, the repeating signalling cycle and the one of the first and second wake periods associated with the selected one of the first and second groups of terminal devices from the base station; the controller is operable to control the transceiver to exchange signalling with the base station via the network node indicated by the received information message, and control the transceiver to exchange the predetermined signalling with the network node indicated by the received information message using the repeating signalling cycle and the one of the first and second wake periods indicated by the received information message.

In an embodiment, the transceiver is operable to receive direct signalling from the base station comprising an information message indicative of the network node, the repeating signalling cycle, and the one of the first and second wake periods associated with each of the first and second groups of terminal devices; and the controller is operable to: control the transceiver to receive signalling from the network node associated with each of the first and second groups of terminal devices as identified in the received information message; measure a signal characteristic of the signalling received from each network node; determine one of the network nodes on the basis of the measured signal characteristic of the signalling received from each network node; and control the transceiver to exchange signalling with the base station via the determined network node, and control the transceiver to exchange the predetermined signalling with the determined network node using the repeating signalling cycle and the one of the first and second wake periods associated with the group of terminal devices associated with the determined network node.

In an embodiment, the transceiver is operable to receive signalling from the network node associated with one of the first and second groups of terminal devices, the signalling comprising an information message indicative of the network node, the repeating signalling cycle and the one of the first and second wake up periods associated with the group of terminal devices associated with the network node; and the controller is operable to: control the transceiver to exchange signalling with the base station via the network node from which the information message is received, and control the transceiver to exchange the predetermined signalling with the network node from which the information message is received using the repeating signalling cycle and the one of the first and second wake periods associated with the group of terminal devices associated with the network node from which the information message is received.

In an embodiment the controller is operable to: control the transceiver to directly transmit a registration request message to the base station, the registration request message comprising a request for information indicative of a network node, a repeating signalling cycle, and the one of the first and second wake periods for establishing one of the first and second groups of terminal devices; control the transceiver to directly receive an information message from the base station, the information message being indicative of a network node, a repeating signalling cycle, and the one of the first and second wake periods for establishing one of the first and second groups of terminal devices, and control the transceiver to exchange signalling with the base station via the network node indicated by the received information message, and control the transceiver the predetermined signalling with the network node indicated by the received information message using the repeating signalling cycle and the one of the first and second wake periods indicated by the received information message.

In an embodiment the controller is operable to: measure a signal characteristic of signalling received from the network node via which the transceiver exchanges signalling with the base station; and if the measured signal characteristic falls below a predetermined threshold, perform a reset process in which the transceiver is controlled to exchange signalling with the base station via the network node associated with a different one of the first and second groups of terminal devices, and control the transceiver to exchange the predetermined signalling with network node associated with the different one of the first and second groups of terminal devices using the repeating signalling cycle and the one of the first and second wake periods associated with the different one of the first and second groups of terminal devices.

In a third aspect, the present technique provides a base station for use in a wireless telecommunications system according to the first aspect, the base station comprising: a transceiver operable to exchange signalling with the first group of terminal devices via the first network node and to exchange signalling with the second group of terminal devices via the second network node; and a controller operable to: assign the repeating signalling signal and first wake period to the first network node and control the transceiver to transmit signalling identifying the repeating signalling cycle and first wake period to the first network node; and assign the repeating signalling cycle and second wake period to the second network node and control the transceiver to transmit signalling identifying the repeating signalling cycle and second wake period to the second network node.

In a fourth aspect, the present technique provides a terminal device for use as a network node in a wireless telecommunications system according to the first aspect, the terminal device comprising: a transceiver; a controller operable to: control the transceiver to receive signalling comprising a message identifying one of the first and second groups of terminal devices, the repeating signalling cycle and one of the first and second wake periods from the base station; control the transceiver to receive signalling from the identified one of the first and second groups of terminal devices and control the transceiver to transmit the received signalling to the base station; control the transceiver to receive signalling from the base station and control the transceiver to transmit the received signalling to identified one of the first and second groups of terminal devices; and control the transceiver to exchange the predetermined signalling with the identified one of the first and second groups of terminal devices using the identified repeating signalling cycle and the identified one of the first and second wake periods.

In a fifth aspect, the present technique provides a method of operating a wireless telecommunications system comprising a plurality of terminal devices operable to communicate with a base station via respective network nodes, wherein the plurality of terminal devices comprises a first group of terminal devices operable to communicate with the base station via a first network node and a second group of terminal devices operable to communicate with the base station via a second network node, the method comprising synchronising each of the first and second groups of terminal devices to communicate with the first and second network nodes, respectively, in a discontinuous mode comprising a repeating signalling cycle, the repeating signalling cycle comprising a first wake period and a second wake period; wherein: the first wake period is a first portion of the repeating signalling cycle and the start of the first wake period is defined by a first offset value relative to the start of the repeating signalling cycle; the second wake period is a second portion of the repeating signalling cycle and the start of the second wake period is defined by a second offset value relative to the start of the repeating signalling cycle, the second offset value being different to the first offset value; each terminal device in the first group of terminal devices exchanges predetermined signalling with the first network node during the first wake period of the repeating signalling cycle, and does not exchange the predetermined signalling with the first network node during a portion of the repeating signalling cycle other than the first wake period; and each terminal device in the second group of terminal devices exchanges predetermined signalling with the second network node during the second wake period of the repeating signalling cycle, and does not exchange the predetermined signalling with the second network node during a portion of the repeating signalling cycle other than the second wake period.

In a sixth aspect, the present technique provides a method of operating a terminal device for use with a wireless telecommunications system according to the first aspect, the terminal device comprising a transceiver operable to exchange signalling with the base station via one of the first and second network nodes, wherein the method comprises: selecting one of the first and second groups of terminal devices; if the first group of terminal devices is selected, controlling the transceiver to exchange signalling with the base station via the first network node, and controlling the transceiver to exchange the predetermined signalling with the first network node during the first wake period of the repeating signalling cycle; and if the second group of terminal devices is selected, controlling the transceiver to exchange signalling with the base station via the second network node, and controlling the transceiver to exchange the predetermined signalling with the second network node during the second wake period of the repeating signalling cycle.

In a seventh aspect, the present technique provides a method of operating a base station for use in a wireless telecommunications system according to the first aspect, the base station comprising a transceiver operable to exchange signalling with the first group of terminal devices via the first network node and to exchange signalling with the second group of terminal devices via the second network node, wherein the method comprises: assigning the repeating signalling signal and first wake period to the first network node and controlling the transceiver to transmit signalling identifying the repeating signalling cycle and first wake period to the first network node; and assigning the repeating signalling cycle and second wake period to the second network node and controlling the transceiver to transmit signalling identifying the repeating signalling cycle and second wake period to the second network node.

In an eighth aspect, the present technique provides a method of operating a terminal device for use as a network node in a wireless telecommunications system according to the first aspect, the terminal device comprising a transceiver, wherein the method comprises: controlling the transceiver to receive signalling comprising a message identifying one of the first and second groups of terminal devices, the repeating signalling cycle and one of the first and second wake periods from the base station; controlling the transceiver to receive signalling from the identified one of the first and second groups of terminal devices and controlling the transceiver to transmit the received signalling to the base station; controlling the transceiver to receive signalling from the base station and controlling the transceiver to transmit the received signalling to identified one of the first and second groups of terminal devices; and controlling the transceiver to exchange the predetermined signalling with the identified one of the first and second groups of terminal devices using the identified repeating signalling cycle and the identified one of the first and second wake periods.

In a ninth aspect, the present technique provides a terminal device for use with a wireless telecommunications system according to the first aspect, the terminal device comprising: transceiver circuitry operable to exchange signalling with the base station via one of the first and second network nodes; and controller circuitry operable to: select one of the first and second groups of terminal devices; if the first group of terminal devices is selected, control the transceiver circuitry to exchange signalling with the base station via the first network node, the controller circuitry controlling the transceiver circuitry to exchange the predetermined signalling with the first network node during the first wake period of the repeating signalling cycle; and if the second group of terminal devices is selected, control the transceiver circuitry to exchange signalling with the base station via the second network node, the controller circuitry controlling the transceiver circuitry to exchange the predetermined signalling with the second network node during the second wake period of the repeating signalling cycle.

In a tenth aspect, the present technique provides a base station for use in a wireless telecommunications system according to the first aspect, the base station comprising: transceiver circuitry operable to exchange signalling with the first group of terminal devices via the first network node and to exchange signalling with the second group of terminal devices via the second network node; and controller circuitry operable to: assign the repeating signalling signal and first wake period to the first network node and control the transceiver circuitry to transmit signalling identifying the repeating signalling cycle and first wake period to the first network node; and assign the repeating signalling cycle and second wake period to the second network node and control the transceiver circuitry to transmit signalling identifying the repeating signalling cycle and second wake period to the second network node.

In an eleventh aspect, the present technique provides a terminal device for use as a network node in a wireless telecommunications system according to the first aspect, the terminal device comprising: transceiver circuitry; controller circuitry operable to: control the transceiver circuitry to receive signalling comprising a message identifying one of the first and second groups of terminal devices, the repeating signalling cycle and one of the first and second wake periods from the base station; control the transceiver circuitry to receive signalling from the identified one of the first and second groups of terminal devices and control the transceiver circuitry to transmit the received signalling to the base station; control the transceiver circuitry to receive signalling from the base station and control the transceiver circuitry to transmit the received signalling to identified one of the first and second groups of terminal devices; and control the transceiver circuitry to exchange the predetermined signalling with the identified one of the first and second groups of terminal devices using the identified repeating signalling cycle and the identified one of the first and second wake periods.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with the same reference numerals and in which:

FIG. 8 provides a schematic diagram of a procedure for setting up a new relay node, according to an embodiment of the present technique;

FIG. 9 provides a schematic diagram of a procedure for setting up a new group of MTC devices, according to an embodiment of the present technique;

DESCRIPTION OF EXAMPLE EMBODIMENTS

Conventional Communications System

Figure 1:
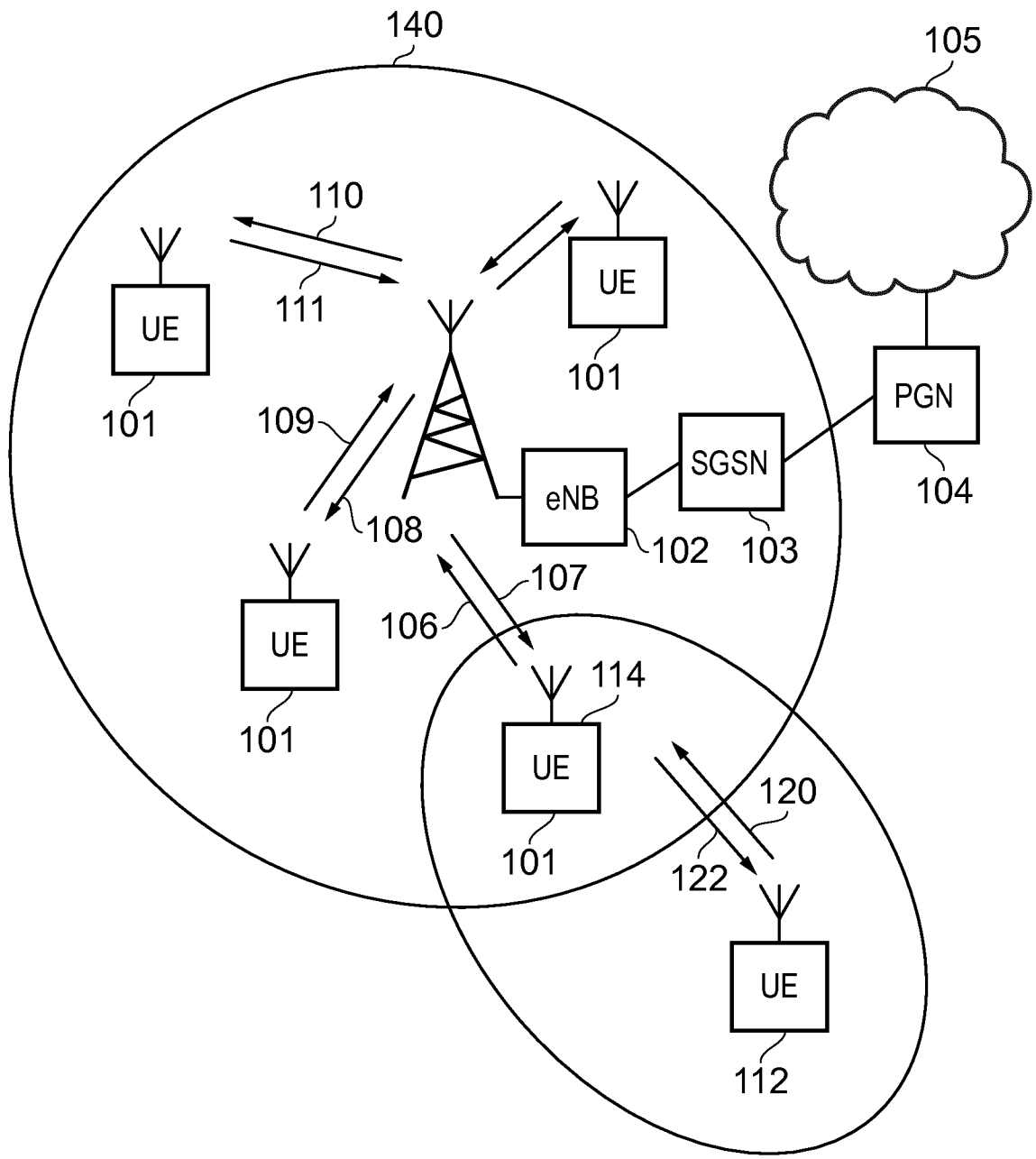
FIG. 1 provides a schematic diagram of a mobile communications system in which in coverage communications devices are communicating via an infrastructure equipment and at least one out-of-coverage communications device is communicating via one of the in-coverage communications devices.

FIG. 1 provides a schematic diagram illustrating some basic functionality of a mobile telecommunications network/system 100 operating in accordance with LTE principles and which may be adapted to implement embodiments of the disclosure as described further below.

Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a conventional mobile telecommunications system 100, where the system includes mobile communications devices 101, infrastructure equipment 102, and a core network comprising a serving gateway node 103, a packet data gateway 104 which forms a gateway to an external network 105. The infrastructure equipment 102 may also be referred to as a base station, network element, enhanced Node B (eNodeB) or a coordinating entity for example, and provides a wireless access interface to the one or more communications devices within a coverage area or cell. The one or more mobile communications devices may communicate data via the transmission and reception of signals representing data using the wireless access interface. The infrastructure equipment 102 is communicatively linked via the serving gateway node 103 and the packet data gateway 104 to the external network 105, which may be connected to one or more other communications systems or networks which have a similar structure to that formed from communications devices 101 and infrastructure equipment 102. The core network may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links represented by lines 106 to 111, where arrows 106, 108 and 110 represent downlink communications from the network entity to the communications devices and arrows 107, 109 and 111 represent the uplink communications from the communications devices to the infrastructure equipment 102. The communications system 100 may operate in accordance with any known protocol, for instance in some examples the system 100 may operate in accordance with a 3GPP Long Term Evolution (LTE) standard where the infrastructure equipment 102 may be referred to as a base station or an enhanced Node B (eNodeB(eNB)).

Also shown in FIG. 1 is a line 140 which represents an indication of a maximum range within which radio signals can be communicated to and from the infrastructure equipment or eNB 102. As will be appreciated the line 140 is just an illustration and in practice there will be a great variation in respect of the propagation conditions and therefore the range in which radio signals can be communicated to and from the eNB 102. As shown in FIG. 1, in one example one of the communications devices 112 has moved to an area which is outside the line 140 representing a range within which radio signals can be communicated to and from the eNB 102. According to the present technique the communications terminal 112 which is outside the range of the eNB 102 may still communicate data to and from the eNB 102 but this is achieved by relaying the data via one of the UE's 114 which acts as a relay node to the communications terminal 112.

In accordance with our pending International patent applications numbered PCT/2014/078087, PCT/2014/078093, PCT/2014/079338, PCT/2014/077447, PCT/2014/077396, PCT/2014/079335, the contents of which is incorporated herein by reference, there is provided a device communications technique which allows one or more communications devices to form a group of communications devices which can communicate data between the group of communications devices without being communicated via an eNB. Such an arrangement can operate within or without a coverage area provided by a base station or eNB.

In one example 3GPP have completed a study item entitled "LTE Device to Device Proximity Services-Radio Aspects" described in a technical report TR36.843. According to the present technique therefore an arrangement is provided in which a UE 112 which falls outside a coverage area of an eNB 102 is able to communicate to the eNB 102 using one of the UEs which is within coverage by acting as a relay node. To this end, UEs 112, 114 perform device-to-device (D2D) communications.

LTE Wireless Access Interface

A brief description of the LTE wireless access interface is explained in the following paragraphs with reference to FIGS. 2 and 3 to support the explanation of the example embodiments of the present technique which are provided in the following paragraphs.

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink.

Figure 2:
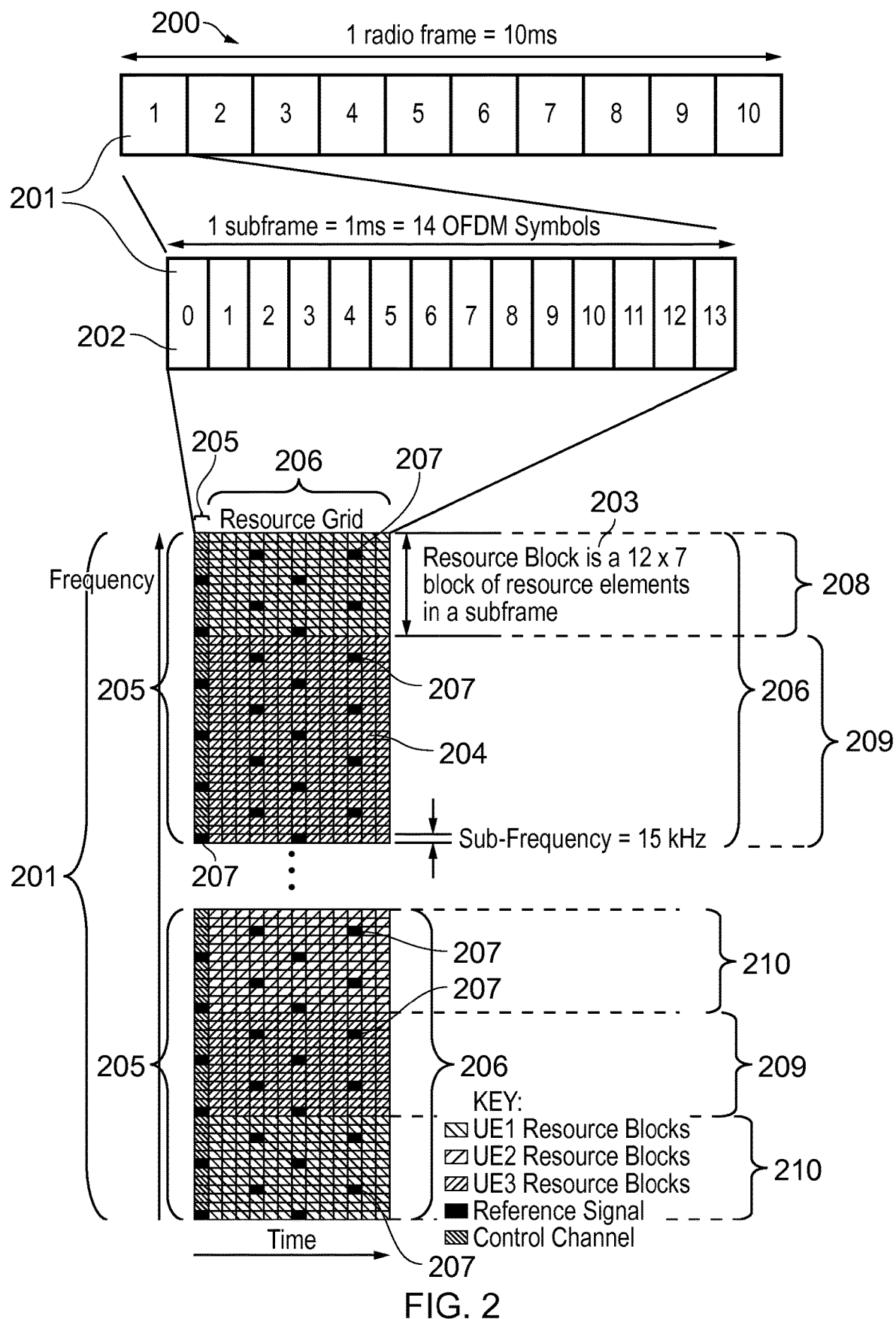
FIG. 2 provides a schematic diagram of the structure of a downlink of a wireless access interface of a mobile communications system.
Figure 3:
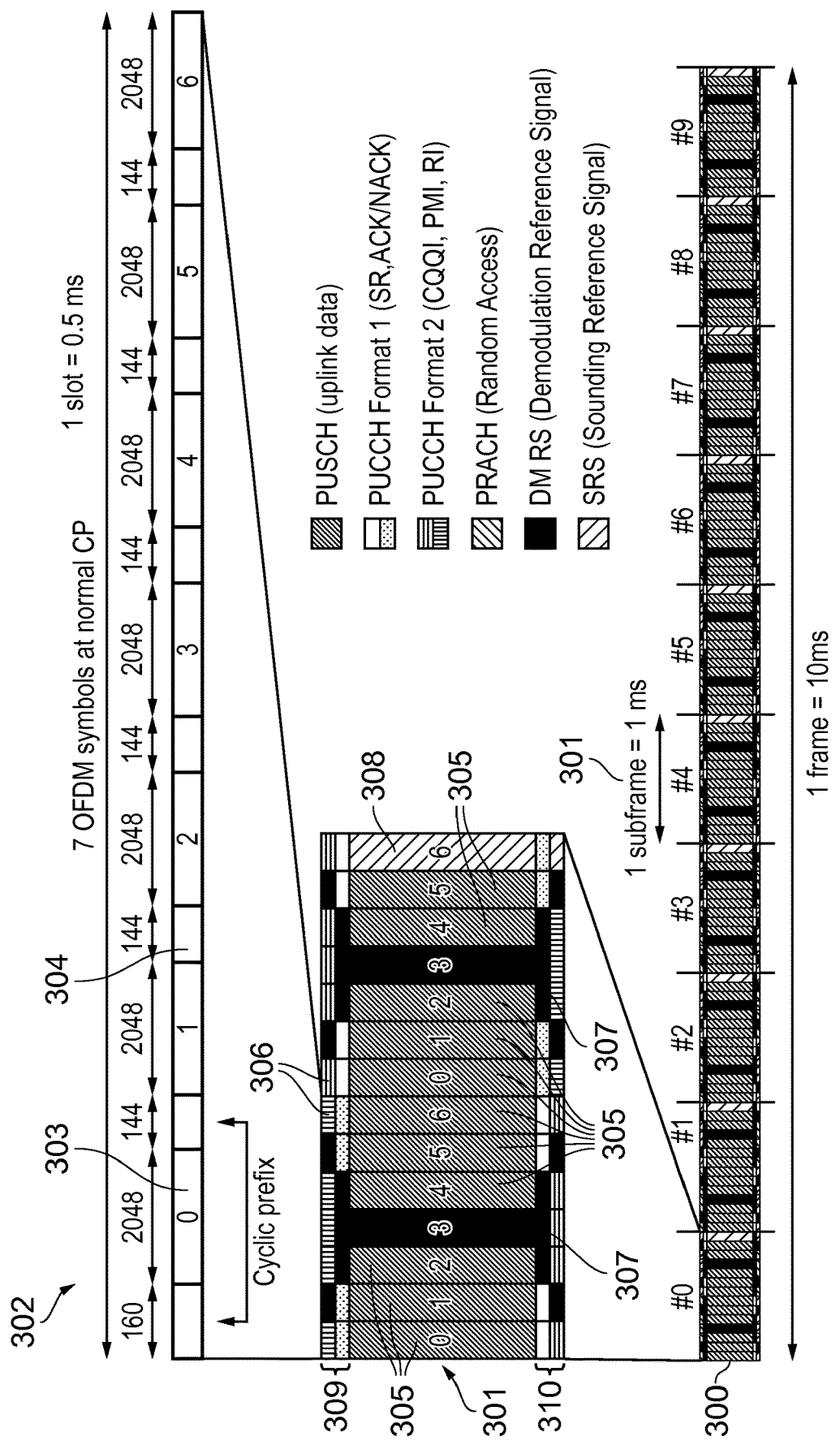
FIG. 3 provides a schematic diagram of an uplink of a wireless access interface of a mobile communications system.

In accordance with the present technique, the wireless access interface for both the down-link shown in FIG. 2 and the up-link shown in FIG. 3 can provide a facility for communicating data from a UE to a mobile communications network via the eNB and for communicating data to the UE from the eNB, but can also provide communications resources for performing D2D communications to another communications device without being communicated via the eNB. The down-link and the up-link of the wireless access interface of FIGS. 2 and 3 respectively will now be explained.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

Supporting an Out-of-Coverage Communications Device

It has previously been proposed to provide some arrangement for device to device communication within standards which define communications systems according to specifications administered by the 3GPP referred to as Long Term Evolution (LTE). These are defined in LTE Release 12 and Release 13 and provide a facility for D2D communications. More generally, a number of possible approaches to the implementation of LTE D2D communications exist. For example, the wireless access interface provided for communications between UEs and eNodeB may be used for D2D communications, where an eNB allocates the required resources and control signalling is communicated via the eNB but user data is transmitted directly between UEs.

In our co-pending International patent applications with the application numbers PCT/2014/078087, PCT/2014/078093, PCT/2014/079338, PCT/2014/077447, PCT/2014/077396, PCT/2014/079335, there is disclosed various techniques for performing D2D communications between devices using the LTE up-link shown in FIG. 3. For example, in the International patent application PCT/2014/079338, there is disclosed an arrangement for performing contentious resolution for D2D communications. Similarly, an arrangement for allocating resources using a scheduling assignment messages transmitted in a scheduling assignment region of an uplink transmission frame is disclosed in International patent application PCT/2014/078093. An arrangement in which communications devices of limited capability which may form machine to machine communications devices can be arranged to perform device to device communications within a limited set of resources (referred to as a virtual carrier) as disclosed in International patent application PCT/2014/077447. Furthermore, an arrangement for identifying resources which can be used for device to device communications between a group of communications devices is disclosed in International patent application PCT/2014/079335, the content of all of the above International patent applications are incorporated into the present application by reference. As will be appreciated therefore these co-pending international patent applications disclose an arrangement for an out-of-coverage UE 112 to communicate on a forward or up-link to an in-coverage UE acting as a relay node 114, represented by an arrow 120 in FIG. 1 and to communicate on a reverse or down-link from the relay-UE 114 to the out-of-coverage UE 112 as represented by an arrow 122 in FIG. 1.

Figure 4:
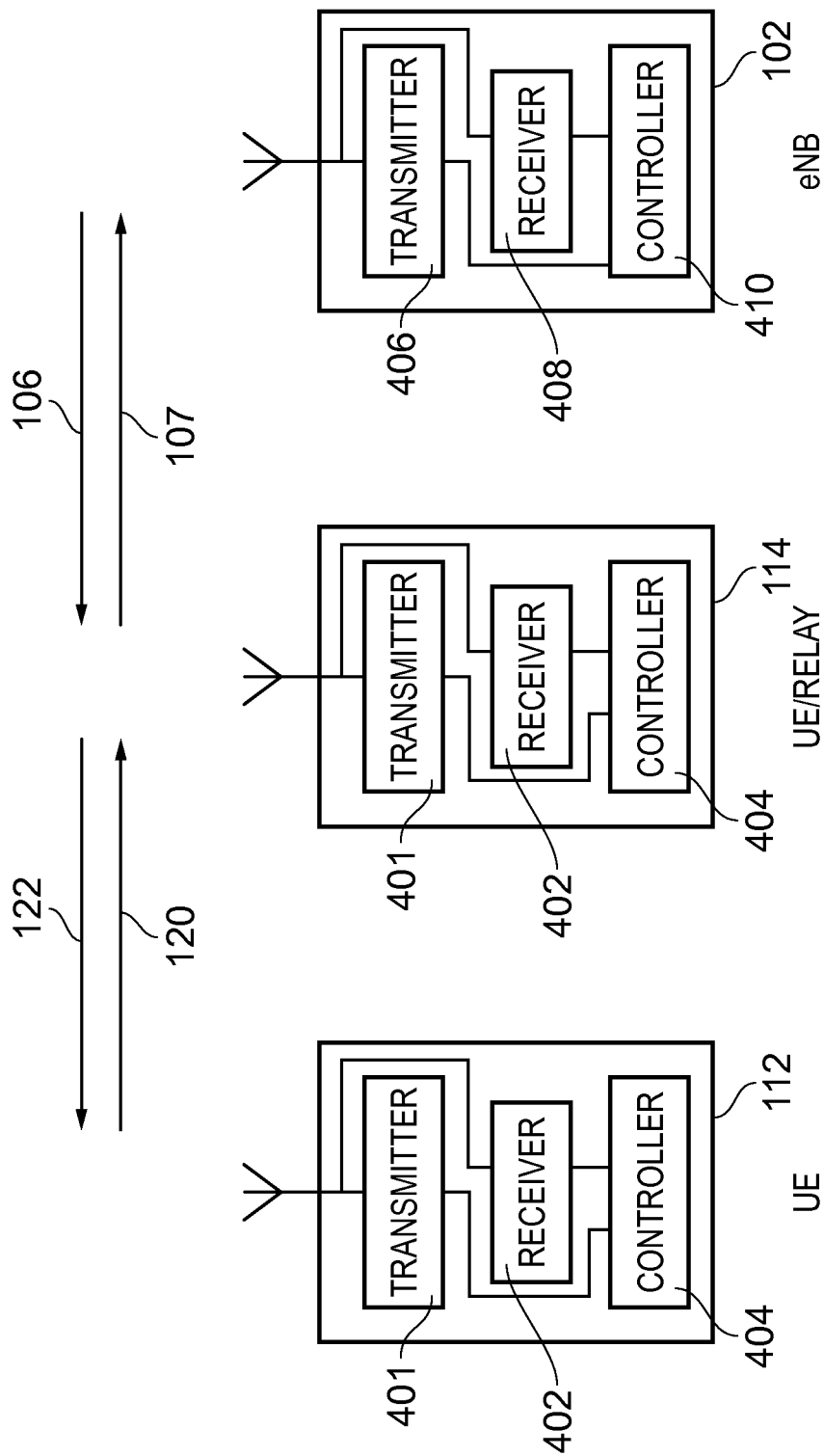
FIG. 4 provides a schematic diagram of an out-of-coverage communications device communicating on an uplink and a downlink with an infrastructure equipment via an in-coverage communications device.

FIG. 4 shows a schematic block diagram of a communications path between the out of coverage UE 112 and the eNB 102, via the in coverage UE acting as a relay node 114. As shown in FIG. 4 the out of coverage UE 112 includes a transmitter 401, a receiver 402 and a controller 404 to control the transmission and reception of signals to the in coverage UE 114 acting as a relay node. It is noted that the transmitter 401 and receiver 402 together form a transceiver. The up-link signals are represented by an arrow 120 which corresponds to that shown in FIG. 1 and the downlink signals are shown by an arrow 122, which corresponds to that shown in FIG. 1. The relay UE 114 could be a conventional UE and so includes also a transmitter 401 receiver 402 and a controller 404. Again, it is noted that the transmitter 401 and receiver 402 together form a transceiver. The in coverage UE acting as a relay node 114 operates in accordance with a conventional arrangement but transmits signals on the uplink as shown by an arrow 107 and receives signals on the downlink as represented by an arrow 106 to and received from the eNB 102 respectively. The eNB 102 includes a transmitter 404, a receiver 408 and a controller 410 which may include a scheduler for scheduling the transmission and reception of signals on the downlink and the uplink in accordance with the wireless access interface shown in FIGS. 2 and 3. Again, it is noted that the transmitter 404 and receiver 408 together form a transceiver. It will also be appreciated that when the UE 112 is within coverage of the eNB 102, the transmitter 401 may, under the control of the controller 404, transmit signals directly to the eNB 102 instead of or in addition to transmitting signals to the eNB 102 via the relay UE 114, and the receiver 402 may, under the control of the controller 404, receive signals directly from the eNB 102 instead of or in addition to receiving signals from the eNB 102 via the relay UE 114. With embodiments of the present technique, an MTC device 500 is an example of a UE 112 and has the same features as the UE 112 (including a transmitter 401, receiver 402 and controller 404), and a network node (which may be a relay node or a small cell) is an example of a UE 114 and has the same features as the UE 114 (including a transmitter 401, receiver 402 and controller 404).

As previously mentioned, the present technique aims to alleviate problems related to efficiently managing the data transmitted to and from large numbers of terminal devices (in particular, MTC terminal devices) over a wireless telecommunications network. In particular, this is a problem when certain coverage extension methods are utilised, such as that in which signals are repeatedly transmitted to MTC devices in order to achieve coverage enhancement (as discussed, for example, in the 3GPP study item titled "Provision of low-cost MTC UEs based on LTE" described in RP-121441 and the resulting technical report TR 36.888). Furthermore, the present technique aims to alleviate problems relating to decreasing the power consumption of MTC devices.

Figure 5:
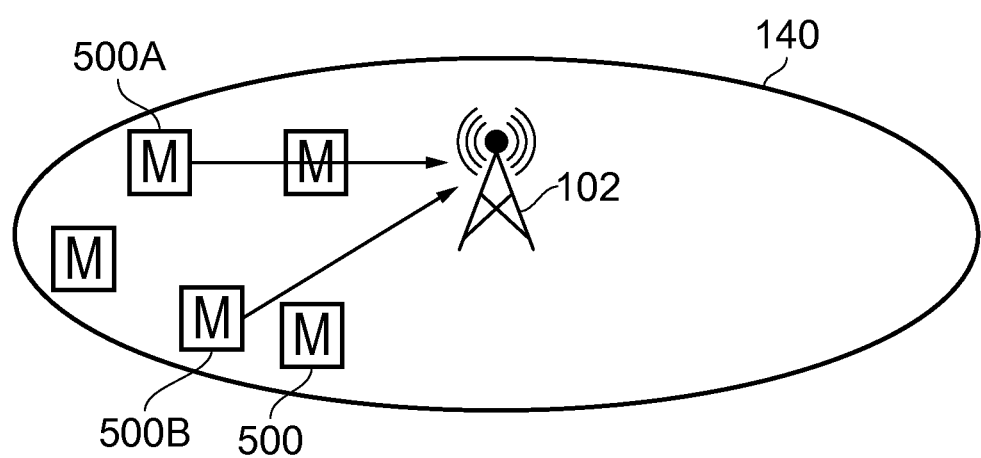
FIG. 5 provides a schematic diagram of a base station and a plurality of MTC devices.

The above-mentioned problems are schematically illustrated in FIG. 5, which illustrates an eNB 102 and a plurality of UEs 500 (in particular, MTC terminal devices, in this example) within the coverage area (cell) of the eNB 102 (as indicated by line 140). For MTC devices located close to the cell edge of the eNB (such as MTC device 500A, 500B), relatively high power transmission with a large number of repetitions to eNB is required in order to successfully transmit signalling to the eNB. Power consumption of the MTC devices 500A, 500B is therefore undesirably high. In addition since a large number of MTC devices 500 is expected to be placed in each cell (five MTC devices are shown here, but it will be appreciated that, in reality, the number of MTC devices may be much larger than this, especially as the number of potential applications for MTC devices increases in the future), a problem arises in enabling the eNB to be able to handle connections with such a large number of eNB devices. The present technique aims to alleviate these problems.

According to a first embodiment of the present technique, it is recognised that the output power of an MTC device 500 should be kept low so as to achieve an improved battery life. Furthermore, it is recognised that MTC devices 500 may suffer significant penetration losses, since in many cases they may be operating under a bad radio environment (for example, this is likely to be the case for automatic gas/electricity meter reading MTC devices).

Figure 6:
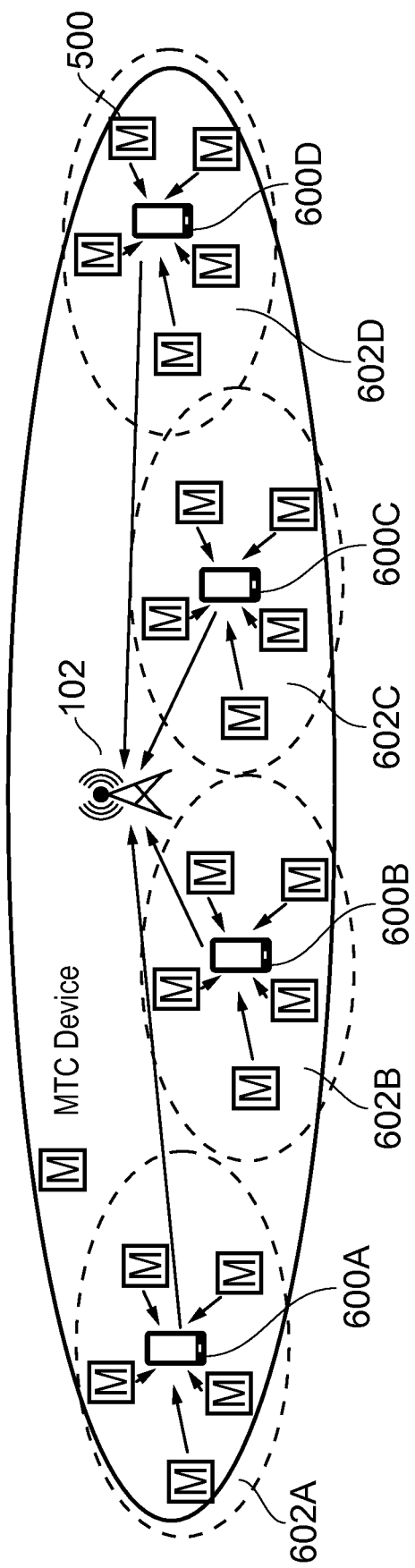
FIG. 6 provides a schematic diagram of a plurality of groups of MTC devices, according to an embodiment of the present technique.

Embodiments of the present technique aim to address these issues, as illustrated in FIG. 6. FIG. 6 shows a plurality of groups 602A, 602B, 602C and 602D of MTC devices 500. The MTC devices 500 in the same group each communicate with the eNB 102 via a relay node 600A, 600B, 600C and 600D associated with that group. That is, each of the groups 602A, 602B, 602C and 602D is associated with a respective relay node 600A, 600B, 600C and 600D through which MTC devices 500 belonging to that group communicate with the eNB 102. Advantageously, because each MTC device exchanges signalling with a more closely located relay node 600A-D rather directly with the further located eNB 102, each MTC device can transmit data to the eNB 102 with a lower output power, thus providing reduced power consumption. It is noted that the relay nodes 600A-D may, alternatively, be small cell eNBs (with micro or pico cell coverage, for example) via which the terminal devices 500 communicate with the macro cell eNB 102. With regard to the present technique, both relay nodes and small cell eNBs perform the same function of being a communication intermediary between the terminal devices 500 and the eNB 102. Relay nodes and small cell eNBs may generically be referred to as network nodes.

Furthermore, in the embodiment of FIG. 6, the relay node 600A-D and MTC devices 500 in each group may exchange signalling using a discontinuous mode comprising a repeating cycle of sleep periods and wake periods. During the sleep periods, the MTC devices 500 in a group do not exchange predetermined signalling with the relay node of that group. On the other hand, during the wake periods, the MTC devices in a group 500 may exchange the predetermined signalling with the relay node of that group. The predetermined signalling exchanged during the sleep and wake periods is explained in more detail later on. Furthermore, the repeating cycle of sleep periods and wake periods of one group are out of synchronisation with the repeating cycle of sleep periods and wake periods of the other groups. Predetermined signalling between the terminal devices 500 and the relay node 600A-D of each group (and thus predetermined signalling between the terminal devices 500 of each group and the eNB 102) thus occur at different times. Advantageously, the signalling load over the network (and, in particular, at the eNB 102) at any one time is therefore reduced The discontinuous mode of each group may be implemented using, for example, the known discontinuous reception (DRX) or extended discontinuous reception (eDRX) technique in LTE. DRX/eDRX is a known technique for lowering power consumption in LTE-type terminals by restricting the number of subframes for which a terminal device should monitor the LTE physical downlink control channel (PDCCH). DRX techniques involve a terminal device and a base station in effect agreeing times (for example, particular subframes) during which the terminal device will be monitoring downlink physical channels and the base station can expect the terminal device to receive transmissions sent to it. The terminal device thus knows that outside these agreed times there are subframes when it will not receive transmissions from the base station, and the terminal device may conserve power during these subframes by not receiving and decoding PDCCH.

DRX is discussed in detail in, for example, the applicant's co-pending PCT application PCT/EP2014/059941. eDRX is slightly different to DRX in that it allows longer cycles with longer sleep periods relative to the wake periods. As currently defined, DRX cycles in LTE can at most be 2.56 s and thus would not allow for sufficient power savings for UEs that need to wake-up less frequently (for example, every few minutes or tens of minutes). Hence, DRX cycle extension (that is, eDRX) is required in order to enable significant battery savings for such UEs by extending the DRX cycle and having a longer sleep period relative to the wake period. The eDRX cycle may be of the order of minutes or tens of minutes, for example. Furthermore, the eDRX cycle can be set depending on the data delay tolerance and power saving requirements, thus providing a flexible solution for achieving significant UE battery savings. eDRX extends the DRX cycle in scenarios where mobile terminated data has a delay tolerance in the order of minutes to an hour. eDRX is explained in, for example, Rel-13 Work Item proposal RP-150493 "RAN enhancements for extended DRX in LTE" from Qualcomm Incorporated, 3GPP TSG RAN Meeting #67, Shanghai, China, 9-12 Mar. 2015 [2].

Thus, a DRX/eDRX mode comprises alternating periods during which a terminal device could potentially receive data from the base station (and hence should monitor PDCCH) and periods during which the terminal device will not receive data (and hence need not monitor PDCCH to save power). The periods in which the terminal device could receive data from the base station can be referred to as DRX/eDRX On Duration periods (see, for example, 3GPP TS 36.321 Figure 3.1-1: DRX Cycle), these thus being wake periods, and the periods in which the terminal device should not receive data from the base station can be referred to as DRX/eDRX inactive periods, these thus being sleep periods. In a DRX/eCRX cycle associated with a particular terminal device (which comprises a DRX/eDRX On Duration period followed by a DRX/eDRX inactive period), the inactive period is the period other than the On Duration period (see, for example, 3GPP TS 36.321 3.1 Definitions for a definition of a DRX Cycle). The length of the On Duration period may be a predetermined time period (this may be referred to as "onDurationTimer"—see, for example, 3GPP TS 36.321 V12.6.0 (2015-06) [3]).

With embodiments of the present technique, both the MTC devices 500 and relay node 600A-D of a particular group operate using the same DRX/eDRX cycle so that data can be transmitted between the MTC devices 500 and relay node 600A-D of that group (and thus between the MTC devices 500 and eNB 102) during the wake periods but not during the sleep periods.

Furthermore, each group is configured to have a different wakeup duration of DRX/eDRX so as to disperse traffic between the MTC devices 500 and the eNB 102 and thus reducing the signalling load over the network at any one time.

Predetermined MTC Grouping

In one embodiment of the present technique, when an MTC device 500 is first placed at a location and its operation is initiated (by turning the MTC device on using a power button, for example), the MTC device may be assigned to an existing group or to a new group based on the location of the MTC device. One example is that the MTC device is initially assigned some group so that MTC devices located in the same predetermined location (for example, the same house, street, post code, area block or commercial facility such as a shopping mall, commercial building, office or the like) form part of the same group in a pre-determined manner. This predetermined group assignment is suitable for an MTC device with little or no mobility (such as a device for reading gas or electricity meters, for example). This predetermined group assignment may be performed by assigning a group identifier (ID) to the MTC device. This group ID may be stored in a storage medium of the MTC device. For example, the group ID can be set into a SIM (Subscriber Identification Module) such as a SIM card, Soft SIM or the like in a predetermined manner.

Assigning a New Group

In this case, the MTC device 500 is assigned to a new group. That is, the MTC device is assigned to a group 602A-D which does not yet comprise any other MTC devices, and has a group ID which has not yet been used. In this case, upon initiation of operation of the MTC device, and if the MTC device detects that it is in coverage of the eNB 102, the MTC device sends a registration request message to the eNB 102. The MTC device can recognize whether or not it is in coverage of the eNB by, for example, by judging the strength of Reference Signal Received Power (RSRP) (the RSRP strength being an example of a signal characteristic) of the eNB. When the eNB receives the registration request message from the MTC device, a specific DRX/eDRX parameter is assigned to this new group (for example, by an element of the core network). The DRX/eDRX parameter indicates the wake period of the DRX/eDRX cycle assigned to the new group, and is chosen so that the wake period of the new group is out of synchronisation with each of the existing groups served by the eNB.

Figure 7:
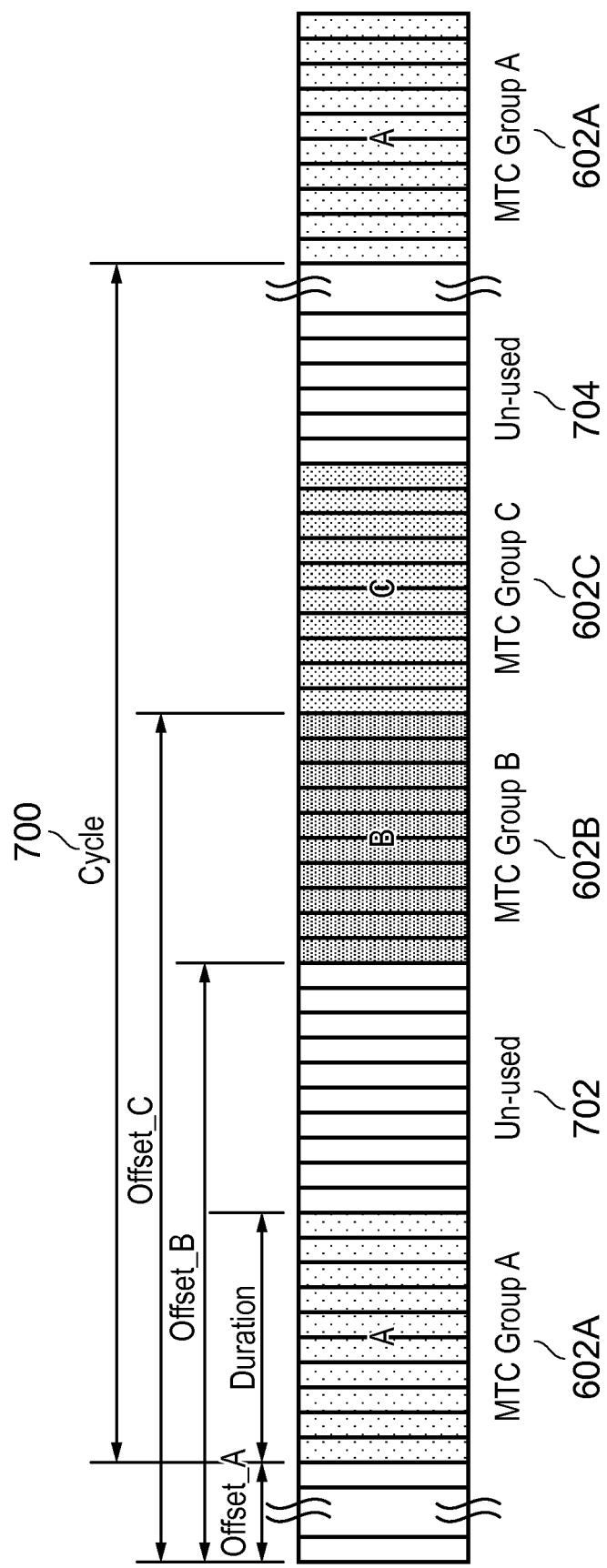
FIG. 7 provides a schematic diagram of an offset as an example of a DRX or eDRX parameter, according to an embodiment of the present technique.

FIG. 7 schematically shows the use of an offset as an example of a DRX/eDRX parameter. In this case, specific offset values, "Offset_A", "Offset_B" and "Offset_C", are each assigned to a respective group served by the eNB 102 so that each group has a different DRX/eDRX wake period. That is, although a repeating DRX/eDRX cycle 700 (which is an example of a repeating signalling cycle) is the same for each group, the wake period of each group occupies a different portion in time of the repeating DRX/eDRX cycle 700, and the specific portion occupied by each group is indicated by the offset. In this example, group 602A is assigned "Offset_A" (and thus has wake period A), group 602B is assigned "Offset_B" (and thus has wake period B) and group 602C is assigned "Offset_C" (and thus has wake period C). The DRX/eDRX cycle 700 is periodically repeated, as shown by the re-starting of a new DRX/eDRX cycle with the wake period A (associated with group 602A) following the end the previous DRX/eDRX cycle. Here, a general "Offset_X" can be configured by a parameter of "drxStartOffset" (see, for example, 3GPP TS 36.321 5.7. Discontinuous Reception (DRX)).

Following the receipt of the registration request message from the MTC device 500 assigned to the new group, the eNB 102, in response, sends back information including a new DRX/eDRX parameter to the MTC device. That is, the eNB 102 transmits a new offset value to the MTC device 500 indicating the portion of the DRX/eDRX cycle 700 corresponding to the wake period of the new group assigned to the MTC device 500. For example, if the MTC device is assigned the new group 602D, then the eNB will transmit a new offset value "Offset_D" (not shown) indicating the portion of the DRX/eDRX cycle corresponding to the new group 602D. It is seen in FIG. 7 that there are two unused portions 702, 704 of the DRX/eDRX cycle 700 which may be indicated by the new offset value and used for the new group 602D. Following receipt of the new offset value, the MTC device sets is wake period according to the new offset value. Thus, for example, if the new offset value "Offset_D" indicates previously unused portion 702, then the wake period of the MTC device will now become portion 702. On the other hand, if the new offset value "Offset_D" indicates previously unused portion 704, then the wake period of the MTC device will now become portion 704.

In addition to sending the DRX/eDRX parameter, the information transmitted to the MTC device by the eNB may further indicate an operation mode, such as an idle or connected mode. The network may indicate an idle mode operation to the MTC device with less frequent transmission in addition to DRX/eDRX operation. On the other hand the network may indicate a connected mode operation to the MTC device with more frequency transmission in addition to DRX/eDRX operation. The MTC device may be converted from idle mode to connected mode in response to a control signal such as a specific control signal, paging signal or the like from the eNB (this is explained in more detail below). When transmitting the registration request message, the MTC device can provide some additional information to the eNB such as a category of the MTC device, equipped function, battery capacity, purpose of usage and so on. The network may then decide on the operation mode (that is, idle or connected) of the MTC device based on this additional information. The idle and connected modes are discussed in more detail later on.

In one embodiment, the network can generate one or more sub-groups so as to take into account the additional information provided by the MTC devices. The network can assign a different DRX/eDRX parameter (for example, a different offset value) to each sub-group among the MTC devices assigned to the same group. To be clear, each sub-group is part of the same group and thus MTC devices in the same group use the same relay node 600A-D to exchange signalling with the eNB even if they are in different sub-groups. However, different MTC devices in different sub-groups of the same group may have a different DRX/eDRX value so that the wake periods of different sub-groups within the same group are different. Each MTC device doesn't necessarily need to recognize the sub-group to which it belongs to. Rather, it must just know the DRX/eDRX parameter assigned to its sub-group in accordance with an indication from the eNB. On the other hand a relay node 600A-D of a group should recognize all sub-groups of MTC devices belonging to it. The relay node can manage the wakeup duration according to DRX/eDRX parameter of each of the sub-groups so as to allow signalling between each of the MTC devices (no matter which subgroup they belong to) and the eNB.

Assigning an Existing Group

In this case, the MTC device 500 is assigned to an existing group. That is, the MTC device is assigned to a group 602A-D which already comprises other MTC devices, and has a group ID which has already been used. In this case, the MTC device therefore needs to join this existing group.

In order to allow this, in one example, the eNB 102 broadcasts information including the DRX/eDRX parameters corresponding to each group. For instance, using the example of FIG. 7, the eNB 102 will broadcast information indicating "Offset_A" together with the associated group ID of group 602A, information indicating "Offset_B" together with the associated group ID of group 602B, information indicating "Offset_C" together with the associated group ID of group 602C, and (assuming, in this case, that group 602D already comprises at least one other MTC device and has thus been allocated an offset value "Offset_D") information indicating "Offset_D" together with the associated group ID of group 602D. An MTC device 500 newly assigned to the existing group receives the broadcast information (assuming that it is in coverage of the eNB 102) and the MTC device sets the parameter for DRX/eDRX operation according to the broadcasted information. Thus, for example, if the MTC device 500 is assigned to existing group 602A, then the MTC device will set the DRX/eDRX parameter to be "Offset_A", if the MTC device is assigned to existing group 602B, then the MTC device will set the DRX/eDRX parameter to be "Offset_B", etc. Here, a general "Offset_X" can be broadcast as the parameter "drxStartOffset", as previously described. In addition, information defining the DRX/eDRX cycle itself (relative to which a general "Offset X" is defined) is broadcast. The information defining the DRX/eDRX cycle itself can be, but need not be, the same for each group of UEs.

The different wake periods for each group are provided via the different offset used for each group. The information defining a DRX cycle is explained in 3GPP TS 36.321, for example.

Another example is that the relay node 600A-D belonging to the same group as the MTC device transmits a discovery signal including its DRX/eDRX parameter. In this case, each of the relay nodes 600A-D transmits such a discovery signal. For example, relay node 600A transmits a discovery signal comprising the group ID of group 602A and the value of "Offset_A" (as well as information defining the DRX/eDRX cycle itself), relay node 600B transmits a discovery signal comprising information the group ID of group 602B and the value of "Offset_B" (as well as information defining the DRX/eDRX cycle itself), etc. The MTC device assigned newly to the existing group receives the discovery signal during a discovery process and the MTC device sets the parameter for DRX/eDRX operation according to the discovery signal. This method is particularly advantageous for the MTC device when it is out of coverage of eNB 102. Here, the relay node may transmit the discovery signal including the parameter for DRX/eDRX operation in accordance with the wakeup duration or at a different timing from the wakeup duration. If the wake period (duration) for each group 600A-D has a relatively low repetition rate per unit time, then it can be desirable that the discovery signal for each group 602A-D is transmitted at a different, more frequent timing to the wake duration for that group. Advantageously, this allows the new MTC device to discover the relay node associated with that group and to appropriately set its DRX/eDRX parameter even outside of the wake duration for that group.

It is noted that, by having the DRX/eDRX parameters broadcast from the eNB or transmitted as part of a discovery signal by the relay nodes, the signalling overhead for MTC devices is reduced. In particular, it is reduced compared to the current DRX configuration in which the DRX/eDRX parameters are signalled to a UE by an RRC (Radio Resource Control) Connection Setup, RRC Connection Reconfiguration or RRC Connection Re-establishment message, since this current procedure may cause overflow of signalling for MTC devices (the number of which is expected to be large).

MTC Device Out of Coverage of eNB

As mentioned above, in the case of an MTC device which is assigned to an existing group 602A-D, if the MTC device is out of coverage of the eNB 102, then the MTC device can be informed of the appropriate DRX/eDRX parameter associated with the group to which it is assigned with the help of the relay node 600A-D associated with that group (this relay node already serving other MTC devices belonging to the group). However, in the case of assigning a new group (that is, a group with a group ID which has not yet been used and which does not yet comprise any MTC devices) to an MTC device which is out of coverage of the eNB 102, a relay node cannot be used in this way because none of the relay nodes are yet associated with this new group (and thus cannot send out a discovery signal in the way described above). A different way of allowing the MTC device to form the new group with an appropriate relay node is therefore required.

In one example, if the MTC device recognizes that it is out of coverage of the eNB 102 by judging the strength of RSRP from the eNB, the MTC device starts transmitting a device-to-device (D2D) discovery signal. If a terminal device within coverage of the eNB receives this discovery signal, the terminal device operates as a relay node to allow signalling between the MTC device and eNB (using, for example, D2D signalling between the in-coverage terminal device and MTC device). The operation of the in-coverage terminal device as a relay node is performed in accordance with authorization from the network. Following the establishment of the relay node, the MTC device then sends a registration request message to the eNB via the relay node. In response, the network assigns a specific DRX/eDRX parameter to the new group associated with the MTC device (the DRX/eDRX parameter being assigned so that the wake period of the new group is out of synchronisation with the wake periods of the existing groups, as previously explained), and the eNB sends back information including the DRX/eDRX parameter to the MTC device via the relay node.

An example of a procedure to setup a new relay node is schematically shown in FIG. 8. Here, at step (1), an MTC device 500 which has been assigned a new group and which is out of coverage of the eNB 102 starts transmission of a discovery signal in a D2D communication manner. Next, if the in-coverage terminal device 600B discovers the discovery signal from the MTC device 500 in D2D communication, then, in step (2), the terminal device 600B sends a request for authorization to operate as a D2D relay node to the eNB 102. If the eNB 102 judges that the terminal device 600B can serve as a relay node for the MTC device 500, then, at step (3), the eNB 102 sends an authorization to operate as a D2D relay node to the terminal device 600B in response to the request for authorization. Finally, after receiving the authorization, the terminal device 600B becomes authorised to serve as the relay node for the MTC device 500. It is noted that the procedure of establishing the terminal device 600B as a relay node may be carried out, for example, according to a suitable procedure described in the applicant's co-pending European patent applications (EP15154659.5 and EP15154751.0).

An example of a procedure to set up a new DRX/eDRX parameter for the out-of-coverage MTC device 500 after the procedure to set up the terminal device 600B as a relay node is schematically shown in FIG. 9. Here, at step (1), the MTC device 500 sends a registration request message to the newly established relay node 600B using a D2D communication manner. At step (2), the relay node 600B then transfers the registration request message to the eNB 102 using a conventional LTE communication manner. At step (3), in response to receiving the registration request message, the network determines a DRX/eDRX parameter for the new group assigned to the MTC device 500. Next, at step (4), the eNB 102 sends the DRX/eDRX parameter to the relay node 600B and, at step (5), the relay node 600B transfers the DRX/eDRX parameter to the MTC device 500. Finally, at step (6), the MTC device 500 sets the received DRX/eDRX parameter as the DRX/eDRX parameter, and the new group is established.

In the examples of FIGS. 8 and 9, it is noted that an existing group is the group 602A. The newly formed group comprising the terminal device 600B as a newly established relay node and the MTC device 500 is group 600B.

Idle and Connected Modes

As has been explained, a mobile telecommunications system (network) according to embodiments of the present technique can activate a relay node for collecting data from MTC devices so as to reduce the transmission power required for MTC devices (thus advantageously reducing power consumption). Furthermore the network can set different DRX/eDRX parameters for the relay nodes and MTC devices of different groups so as to reduce the signalling overhead of the network at a given moment in time.

However, the network can also set operation modes of MTC devices such as idle and connected mode under DRX/eDRX operation. These modes take into account, for each MTC device, for example, the category (UE category), the equipped function, the battery capacity, the purpose of usage and so on, which may be included in the registration request message sent by the MTC device.

In order to explain the idle and connected modes, it is noted that in general, the necessary procedure at an MTC device should be at least monitoring a paging message and TA (Tracking Area) update during the wake periods in idle mode and monitoring a PDCCH (that is, scheduling information) during the wake periods in connected mode. Although the main purpose of introducing DRX/eDRX should be reduction of power consumption, at least these procedures (that is, paging message monitoring and TA update, and PDDCH monitoring) have to be performed during a wake duration in idle or connected mode, respectively. On the other hand these procedures can be paused or reduced during a sleep duration (this pausing or reduction is generally being a matter of specific implementation). It is desirable for these procedures to be as least active as possible during the sleep duration in idle or connected mode so as to reduce MTC device power consumption. The procedures for the wake duration can then be performed as soon as the relay nodes and MTC devices turn to the wake duration. Another important procedure is measurement of channel quality for mobility. A frequency of this measurement can be reduced during the sleep duration. This measurement would be used for cell selection/reselection in idle mode and handover in connected mode.

To be clear, in LTE, DRX/eDRX can be applied to both idle and connected mode. In idle mode, a UE will monitor a paging message during only wake periods and the network can communicate with the UE after making the UE enter the connected mode in response to the paging message. In this case, the paging message is the predetermined signalling, and acts as a control signal to control the UE to enter the connected mode. In connected mode, a UE will monitor a PDCCH during only wake periods and the UE can receive and transmit data according to the PDCCH. In this case, the PDCCH is the predetermined signalling, and acts as a scheduling signal for scheduling radio resources for use by the UE. In this sense it will take a longer time to start communication in idle mode, as compared to connected mode. So, the network or a UE itself can decide whether it is in idle or connected mode, taking into account the expected operation in comparatively short duration and allowable latency of communication.

From the general point of view, the power consumption of idle mode should be expected to be lower than that of connected mode, even during the sleep duration of connected mode. For example, if the idle mode is applied to a low mobility MTC device for meter-reading, signal measurements can be omitted and a synchronization performed at the minimum frequency during the sleep duration. On the other hand, since RRC connection or some sort of connection like RRC connection should be kept in connected mode, signal measurements need to be performed during the sleep duration (even if less frequently than in the wake duration). In an embodiment, whether an operation mode of an MTC device or a relay node is set as connected or idle mode can be configured by the network or by the MTC device itself, taking into account how frequent the MTC device is scheduled to transmit data, how often the network could dynamically request the MTC device to transmit data, mobility of the MTC device and so on.

The mode of a relay node and/or MTC device can be changed from idle mode to connected mode (or from connected mode to idle mode) in response to a control signal (such as a paging signal) transmitted from the eNB. Nevertheless, if the relay node or MTC device is in idle mode or connected mode, then such a control signal may be received during a wake duration of the DRX/eDRX operation. In the idle mode, a paging signal may be transmitted prior to the transmission of the control signal, or the control signal itself can include an instruction to change the operation mode in order to make the relay node or MTC device switch to be in connected mode.

In one example, MTC devices are used for a purpose of gas or electricity meter-reading. In this case, a transmission of meter-reading data may be performed relatively infrequently (once per week or month, for example). In this case, the network instructs the MTC devices to operate in idle mode with a DRX/eDRX operation. The network also instructs the relay node which collects the data from the MTC devices to operate with the same DRX/eDRX operation (and thereforethe same wake duration) and to operate in idle mode. In order to take into account mobility of the relay node during such a long duration such as a week or month, the network or each MTC device can activate a different terminal device as a relay node every time meter readings are required based on the location of the MTC devices assigned to the same group and in accordance with the wakeup duration of the MTC devices. For example, if one of the MTC devices assigned to the same group detects being out of coverage of the relay node during the wake duration due to mobility of that node, it can send a request to set up new relay node to the network. In order to avoid any duplicated requests from other MTC devices, one example is that an MTC device can transmit a signal including notification of having transmitted a request to the network to the other MTCs in the same group by using group communication such as device-to-device (D2D) communication. The other example is that the network may transmit this notification as part of a broadcasted signal after receiving the request for a new relay node. If any MTC devices assigned to the same group receive this notification, they then stop transmitting data. In accordance with reception of the new relay node request, the network performs the procedure of establishing a terminal device as a relay node based on the location of the MTC devices assigned to the same group. It is noted that this procedure may be carried out, for example, according to a suitable procedure described in the applicant's co-pending European patent applications EP15154659.5 and EP15154751.0. Furthermore air interfaces used for this establishing the relay node and transmitting data from/to the MTC devices may not be always same (for example, an air interface for D2D communication such as a PC5 interface specified for Proximity Services (ProSe) in 3GPP can be used for establishment of the relay node and an LTE Uu interface or newly introduced interface can be used for data transmission from/to the MTC devices with operation of DRX/eDRX after that establishment).

In addition, the network can activate the relay node and trigger the transmission from MTC devices in accordance with a specific control signal from the network. This specific control signal is transmitted from the eNB which serves the relay node and its associated MTC devices. The relay node receives the specific control signal during the wake duration of the DRX/eDRX operation in idle mode, changes the operation mode to connected mode, and transfers the specific signal to the MTC devices. Then, when the MTC devices receive the specific control signal via the relay node during the wake duration of the DRX/eDRX operation in idle mode, each MTC device changes its operation mode to connected mode and transmits the data (in particular, meter-reading data) requested by the control signal (the control signal including the necessary scheduling information). Subsequently, the MTC devices themselves can change the operation mode back to idle mode, either when the MTC devices finish transmitting data, or at the timing to turn to the sleep duration. It is noted that unless the relay node and MTC devices receive the specific control signal during the wakeup duration of the DRX/eDRX operation in idle mode, the idle mode is maintained.

In a second example, MTC devices are used as sensors such as temperature sensors or the like. In this case, frequency of transmission of the sensing data may be dynamically changed after each of a periodic time period (for example, after each hour). In this case, the network dynamically instructs the MTC devices to configure the different setups of the DRX/eDRX operation in accordance with a specific control signal including information of a specific DRX/eDRX setup (that is, specific timing of wake periods and sleep periods). The network also instructs the relay node which collects the data from the MTC devices to operate with the same DRX/eDRX operation as that of the MTC devices. The specific control signal is transmitted from the eNB to the relay node in accordance with the wakeup duration of the DRX/eDRX operation in connected mode, and transferred to the MTC devices after the MTC devices have changed their operation mode to connected mode by a paging message during the wakeup duration in accordance with the reception of the specific control signal. In addition, if the MTC devices are scheduled to transmit data periodically over a periodic duration, the operation mode of MTC devices can be configured to be in connected mode with DRX/eDRX during the period duration and idle mode during the remaining duration.

In a third example, if requests to transmit data are performed by the network, the network can instruct a relay node to operate in connected mode with DRX/eDRX so that it is possible for the network to perform the paging procedure on a relay node basis rather than on a TA basis. This is because, if the relay node is in idle mode, the network may have to send a paging message to all relay nodes belonging to the same TA in accordance with every request. This causes a lot of signalling exchange and undesirably consumes more radio resources. Here the network doesn't always need to keep information of each MTC device (that is, the UE context or the like). If the relay node is in connected mode and the network has knowledge of the correspondence of the group information (the group information including the group ID and DRX/eDRX parameters for each group) to UE context of the relay node, the network can send the specific control signal to the relay node according to the group information. According to this procedure the network can make MTC devices operate in idle mode so as to reduce the power consumption. That is to say, by the network's keeping tracking which group each MTC device belongs to, the network can send the specific control signal to only the relay belonging to the same group and the usage of radio resources for the paging purpose can be minimized. In this case the relay node receives the specific control signal during the wake duration of the DRX/eDRX operation in connected mode. Subsequently the relay node can send a paging message to the MTC devices prior to sending the specific control signal, if the MTC devices are in idle mode. Then, when the MTC devices receive the specific control signal via the relay node during the wake duration of the DRX/eDRX operation in connected mode, each MTC device transmits the data requested by the control signal (the control signal including the necessary scheduling information). It is noted that unless MTC devices receive the specific control signal during the wakeup duration of the DRX/eDRX operation in idle mode, the idle mode is maintained. On the other hand, if MTC devices were to operate in connected mode, the operation mode of MTC devices could be changed to idle mode in response to a control signal including a notification to change to idle mode from the eNB, or the MTC devices could decide to change to idle mode by themselves, unless the MTC devices receive the specific control signal during the wakeup duration of the DRX/eDRX operation in connected mode. That is to say, this transmission can be triggered in an on-demand manner according to the specific control signal from the network.

In one embodiment, the network can instruct (using control signals transmitted by the eNB 102) the relay node and MTC devices of a particular group to operate with a different DRX/eDRX cycle between idle mode and connected mode and a variable DRX/eDRX cycle in idle mode or connected mode respectively configured by the network. This allows data to be transmitted more frequently or in an on-demand manner in connected mode.

It is also noted that, in one embodiment, if the MTC devices or the relay node of a particular group judge that the relay node can no longer operate as a relay for collecting data from the MTC devices (for example, due to the relay node moving to a different location), the network may trigger a relay node selection/reselection procedure. This relay node selection/reselection procedure may be carried out, for example, using a suitable procedure described in the applicant's co-pending European patent applications (EP15154659.5 and EP15154751.0).

To be clear, in idle mode, the relay node and MTC devices of a group operate with the DRX/eDRX cycle allocated to that group. The relay node and MTC devices perform monitoring of a paging message or a specific control signal including an indication to change the operation mode to connected mode from the eNB. The relay node and MTC devices can change the operation mode to connected mode in accordance with a reception of the paging message or the specific control signal. Furthermore, measurement of channel quality between the eNB and relay node and/or between the relay node and MTC devices occurs only during the wake period (duration) of the DRX/eDRX cycle. Based on a result of measurement, the relay node and MTC devices can request selection/reselection of the relay node to the network, as mentioned above.

On the other hand, in connected mode, the relay node and MTC devices of a group operate with the DRX/eDRX cycle allocated to that group. Monitoring of a control signal from the eNB and downlink and uplink data communication between the relay node and MTC devices and/or between the eNB and the relay node again occur only during the wake period (duration) of the DRX/eDRX cycle. However, measurement of channel quality between the eNB and relay node and/or between the relay node and MTC devices may occur during the sleep period (duration) of the DRX/eDRX cycle as well as during the wake period (duration) of the DRX/eDRX cycle.

Dynamic MTC Grouping

The above-described embodiments assume that the MTC devices of a group have little or no mobility (for example, the MTC devices may be meter-reading devices or the like which simply stay in one place at their associated gas or electricity meter once their operation has been initiated). In other embodiments, however, it is assumed that, although an MTC device may have no mobility for a relatively long time, it could nonetheless be placed at a different location after its operation is first initiated (for example, it may be moved in plug and play manner). In this case, it is advantageous for MTC devices to be dynamically allocated to a newly assigned group or to an existing group rather than to be allocated in a pre-determined manner, as previously described.

Specifying a Suitable Group ID and DRX/eDRX Parameter

Figure 10:
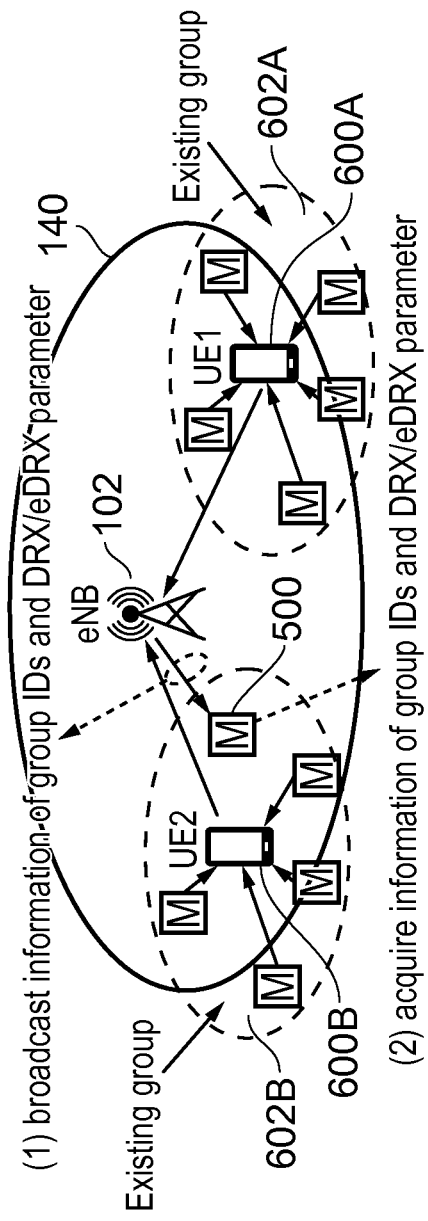
FIG. 10 provides a schematic diagram of a first procedure for dynamic MTC group allocation, according to an embodiment of the present technique.

One example of dynamic MTC group allocation is schematically shown in FIG. 10. In step (1), an eNB 102 broadcasts information including group IDs used for relay nodes in coverage of the eNB 102 and the DRX/eDRX parameter corresponding to each group ID. At step (2), an MTC device 500 looking to newly join a group receives the broadcast information so as to have a knowledge of possible group IDs and the DRX/eDRX parameter corresponding to each group ID. The eNB 102 may perform this broadcast using the LTE System Information Block (SIB). This example may be applicable when the MTC device 500 is placed in coverage of the eNB 102. After the MTC device 500 has received the broadcast information, the MTC device tries to check a discovery signal transmitted by each relay node. Each relay node may transmit such a discovery signal during a wake duration of the DRX/eDRX operation associated its group, for example. The MTC device 500 checks for a discovery signal from the relay node of each group specified by its group ID in the received broadcast information so as to measure a received strength of the discovery signal (the received signal strength being an example of a signal characteristic, another example being the received signal quality). As a result of this measurement, the MTC can specify the most suitable group among the possible groups identified in the broadcast information, and set its DRX/eDRX parameter to be that of the specified group. For example, the MTC may specify the group whose relay node discovery signal is measured to have the highest strength.

In the example of FIG. 10, the broadcast information transmitted from the eNB 102 will identify the group IDs and associated DRX/eDRX parameters of each of the groups 602A and 602B (these being all the groups served by the eNB 102 in FIG. 10). In this case, since the MTC device 500 is located nearer to the relay node 600B of group 602B than to the relay node 600A of group 602A, the measured signal strength of the relay node 600B is higher than the measured signal strength of the relay node 600A. The MTC device 500 thus sets its DRX/eDRX parameter to that of the group 602B and joins the group 602B.

Figure 11:
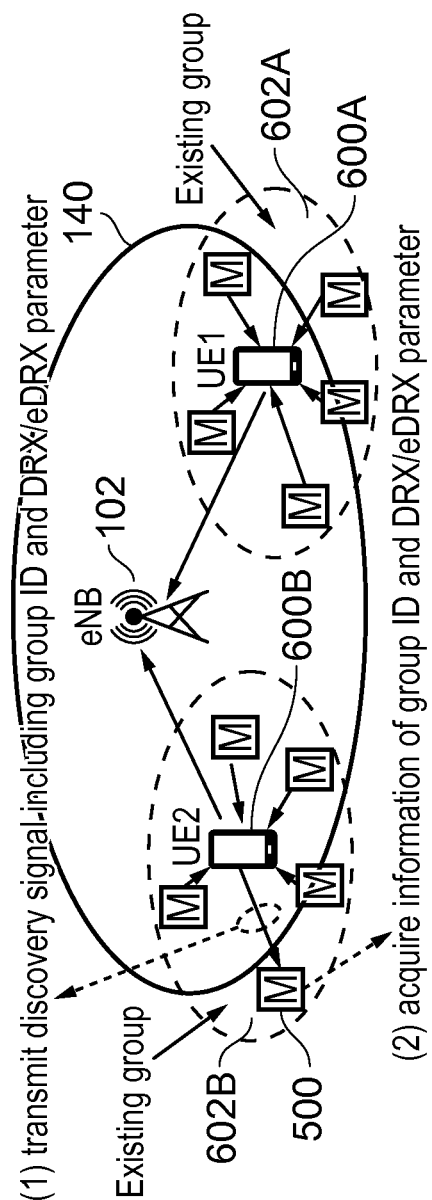
FIG. 11 provides a schematic diagram of a second procedure for dynamic MTC group allocation, according to an embodiment of the present technique.

Another example of dynamic MTC group allocation is shown in FIG. 11. In step (1), a relay node 600B transmits a discovery signal including the group ID and DRX/eDRX parameter of the group 602B to which the relay node 600B is associated. At step (2), an MTC device 500 receives the discovery signal so as to have knowledge of the group ID and DRX/eDRX parameter corresponding to the group 602B. The MTC device 500 can therefore specify the group ID and DRX/eDRX parameter of the group 602B on the basis of the received discovery signal, thus joining the group 602B. This example may be applicable when the MTC device is placed out of coverage of the eNB 102.

It is noted that both the relay nodes 600A and 600B may transmit such a discovery signal. In this case, the MTC device 500 may choose which group to join (that is, group 602A or group 602B) on the basis of which of the discovery signals has the highest received signal strength, for example. Furthermore, since a wake duration of the DRX/eDRX operation of each relay node 600A and 600B may be insufficiently frequent for allowing the MTC device 500 to join the relevant group 602A or 602B on the basis of a discovery signal transmitted only during this wake duration, each relay node 600A, 600B may advantageously transmit its discovery signal more frequently. That is, each relay node may transmit its discovery signal during the sleep duration of its DRX/eDRX operation instead of or in addition to transmitting the discovery signal during the wake duration. Alternatively, the relay node may have more frequent cycle of DRX/eDRX than that of the MTC device.

It is noted that idle and connected modes may be utilised in dynamic MTC grouping in the same way as previously described for predetermined MTC grouping (see sub-heading "Idle and connected modes" above.

Assigning a New Group ID and DRX/eDRX Parameter Corresponding to the New Group ID If no relay node is located close enough to an MTC device and thus the MTC device cannot find a suitable existing group, it can send a request to the eNB for a new group ID to be assigned to it together with a corresponding new DRX/eDRX parameter. In response, the network determines a new group ID and corresponding DRX/eDRX parameter, and these are transmitted as information from the eNB to the MTC device. The eNB then requests an in-coverage terminal device to operate as a relay node for the MTC device, thus establishing a new group with the newly assigned group ID and DRX/eDRX parameter. The selection of a suitable relay node may be carried out using, for example, a suitable selection/reselection procedure described in the applicant's co-pending European patent applications (EP15154659.5 and EP15154751.0).

Resetting the Previous Group ID and DRX/eDRX Parameter

As described above, when an MTC device is placed at a new location, the MTC device has to newly join a group of MTC devices. In order to do this, the MTC device must determine the group ID and DRX/eDRX parameter of the group that it wishes to join. If the MTC device has moved from a previous location and was part of a previous group which is no longer within signalling range, the group ID and DRX/eDRX parameter of the previous group must be replaced with the group ID and DRX/eDRX parameter of the new group. In other words, the group ID and DRX/eDRX parameter specified by the MTC device must be reset.

In one example, if the MTC device cannot find a synchronization signal or a discovery signal transmitted from the relay node of its current group, the MTC device resets its configuration relating to the current group ID and associated DRX/eDRX parameter. This resetting comprises triggering the process previously described under the headings "Specifying a suitable group ID and DRX/eDRX parameter" or "Assigning a new group ID and DRX/eDRX parameter corresponding to the new group ID" so as to find a new group ID and DRX/eDRX parameter for the MTC device.

Figure 12:
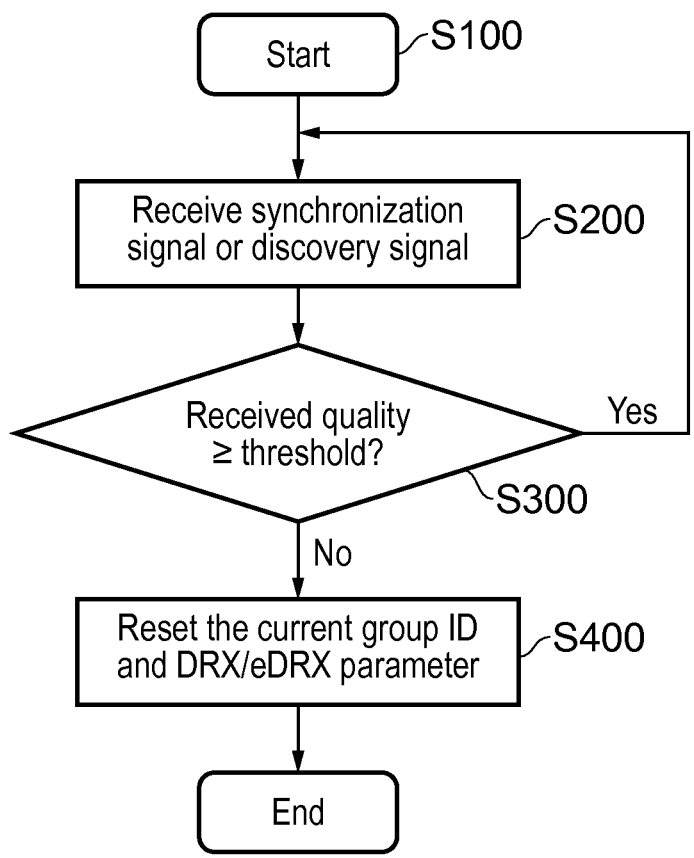
FIG. 12 provides a schematic diagram of a procedure to reset the current setup of DRX or eDRX in an MTC device, according to an embodiment of the present technique.

A procedure to reset the current setup of DRX/eDRX in accordance with mobility of the MTC device is schematically shown in FIG. 12. The process starts at step S100. At step S200, the MTC device monitors a synchronization signal or discovery signal in accordance with a wake duration of the DRX/eDRX operation corresponding to the current group ID. Next, at step S300, a received quality of the synchronization signal or discovery signal is evaluated. If the received quality is greater than or equal to a threshold, then the process returns to S200. On the other hand, if the quality is less than the threshold (S300), then the process moves to step S400, in which the MTC device resets the configuration relating to the current group ID and DRX/eDRX parameter, as described. Here, the threshold for the received quality of the synchronisation signal or discovery signal may be predetermined or, alternatively, may be configured dynamically by the network.

It will thus be appreciated from the above-mentioned description that the present technique has several advantages, including reduced power consumption of MTC devices and reduced signalling load (or overhead) related to have a large number of MTC devices. As an added advantage, since different groups of MTC devices perform data communication with the eNB via respective relay nodes at different times, interference between MTC devices in different groups can be mitigated.

It will be appreciated that, throughout this description, it has been mentioned that certain characteristics of signals may be measured. For example, a measured signal characteristic of a signal transmitted by an eNB, terminal device or network node (such as a relay node or small cell) may be the RSRP strength of the signal, another measure of signal strength, or a measure of signal quality. It will, however, be appreciated that such examples are non-limiting and that any signal characteristic which is indicative of the conditions of the communication channel over which a particular signal is transmitted may be a suitable signal characteristic that may be measured.

Further features and advantages relating to the present technique are defined as follows:

A macro eNB broadcasts information including DRX or eDRX parameters used by terminal devices which act as relay nodes or small cells (these being examples of network nodes)
  The DRX or eDRX parameter can have a different timing offset to each other and each DRX or eDRX parameter is associated with a respective group of MTC devices
  The macro eNB can manage which DRX or eDRX parameter each network node is currently using
An MTC device with a specific UE category is configured to setup a DRX or eDRX parameter in accordance with the network node whose link quality is judged to be greater than or equal to a threshold
  The DRX or eDRX parameter of MTC devices may be equivalently indicated by UE relay or UE small cell
  The threshold is predetermined or configured by macro eNB
  The MTC device can send a request to participate in the group to which the UE relay or UE small cell belongs in conjunction with setting up the DRX or eDRX parameter
An MTC device which doesn't participate any group or is not configured to setup DRX or eDRX parameter should monitor link qualities of the currently operating UE relays or UE small cells based on the broadcasted information of DRX or eDRX parameters
  If the link quality between the UE relay or UE small cell and MTC device is greater than or equal to a threshold, then MTC device should participate in the group belonging to that UE relay or UE small cell,
  Alternatively, if the link quality between the UE relay or UE small cell and MTC device is less than the threshold, the MTC should send a request to the eNB in order to activate new UE relay or UE small cell which should have a different DRX or eDRX parameter from those of the currently operating UE relays or UE small cells. The DRX or eDRX parameter of the new UE relay or UE small cell should be indicated by macro eNB.
UE relay or UE small cell can operate in idle mode or connected mode, this being managed by the macro eNB
  The macro eNB should keep context of UE relay or UE small cell in connected mode and can release context of UE relay or UE small cell in idle mode
An MTC device with a specific UE category can operate in idle mode or connected mode, this being managed by the UE relay or UE small cell
  The UE relay or UE small cell should keep context of MTC devices in connected mode and can release context of MTC devices in idle mode
  The context of MTC devices can be transferred from the currently operating UE relay or UE small cell to a newly activated UE relay or UE small cell in conjunction with reselection of UE relay or UE small cell.

The key difference between idle mode and connected mode is that in idle mode a UE has to monitor a paging message during the wake period and in connected mode a UE has to monitor the specific control signal such as PDCCH during the wake period.

If the network releases the context of a UE (as occurs in idle mode), the network cannot send any control signal directly to that UE. So, a paging procedure is used. The network manages mobility of a UE in idle mode by tracking area (TA), even if the network doesn't have the context of the UE. The network can send the paging message to the UE inside the TA. This paging message can be sent via a plurality eNBs belonging to the same TA.

It will thus be appreciated that an embodiment of the present technique provides a wireless telecommunications system comprising: a base station; a first network node; a first group of terminal devices operable to exchange signalling with the base station via the first network node; a second network node; and a second group of terminal devices operable to exchange signalling with the base station via the second network node; wherein the base station is operable to control the first network node to periodically exchange predetermined signalling with the first group of terminal devices and to control the second network node to periodically exchange predetermined signalling with the second group of terminal devices, wherein the predetermined signalling periodically exchanged between the first network node and the first group of terminal devices is out of synchronisation with the signalling periodically exchanged between the second network node and the second group of terminal devices.

Thus there has been described a telecommunications system comprising a plurality of terminal devices operable to communicate with a base station via respective network nodes, wherein the plurality of terminal devices comprises a first group of terminal devices operable to communicate with the base station via a first network node and a second group of terminal devices operable to communicate with the base station via a second network node, wherein each of the first and second groups of terminal devices are synchronised to communicate with the first and second network nodes, respectively, in a discontinuous mode comprising a repeating signalling cycle, the repeating signalling cycle comprising a first wake period and a second wake period; wherein: the first wake period is a first portion of the repeating signalling cycle and the start of the first wake period is defined by a first offset value relative to the start of the repeating signalling cycle; the second wake period is a second portion of the repeating signalling cycle and the start of the second wake period is defined by a second offset value relative to the start of the repeating signalling cycle, the second offset value being different to the first offset value; each terminal device in the first group of terminal devices is operable to exchange predetermined signalling with the first network node during the first wake period of the repeating signalling cycle, and to not exchange the predetermined signalling with the first network node during a portion of the repeating signalling cycle other than/outside the first wake period; and each terminal device in the second group of terminal devices is operable to exchange predetermined signalling with the second network node during the second wake period of the repeating signalling cycle, and to not exchange the predetermined signalling with the second network node during a portion of the repeating signalling cycle other than/outside the second wake period. Various features of the present technique are defined by the following numbered clauses:

1. A wireless telecommunications system comprising a plurality of terminal devices operable to communicate with a base station via respective network nodes, wherein the plurality of terminal devices comprises a first group of terminal devices operable to communicate with the base station via a first network node and a second group of terminal devices operable to communicate with the base station via a second network node, wherein each of the first and second groups of terminal devices are synchronised to communicate with the first and second network nodes, respectively, in a discontinuous mode comprising a repeating signalling cycle, the repeating signalling cycle comprising a first wake period and a second wake period; wherein:
   the first wake period is a first portion of the repeating signalling cycle and the start of the first wake period is defined by a first offset value relative to the start of the repeating signalling cycle;
   the second wake period is a second portion of the repeating signalling cycle and the start of the second wake period is defined by a second offset value relative to the start of the repeating signalling cycle, the second offset value being different to the first offset value;
   each terminal device in the first group of terminal devices is operable to exchange predetermined signalling with the first network node during the first wake period of the repeating signalling cycle, and to not exchange the predetermined signalling with the first network node during a portion of the repeating signalling cycle other than the first wake period; and
   each terminal device in the second group of terminal devices is operable to exchange predetermined signalling with the second network node during the second wake period of the repeating signalling cycle, and to not exchange the predetermined signalling with the second network node during a portion of the repeating signalling cycle other than the second wake period.

2. A wireless telecommunications system according to clause 1, wherein:
   the discontinuous mode of the first group of terminal devices is one of an idle mode or a connected mode, wherein in the idle mode, the predetermined signalling comprises a control signal for controlling a terminal device of the first group of terminal devices to enter the connected mode, and wherein in the connected mode, the predetermined signalling comprises a scheduling signal for scheduling radio resources for use by a terminal device of the first group of terminal devices; and
   the discontinuous mode of the second group of terminal devices is one of an idle mode or a connected mode, wherein in the idle mode, the predetermined signalling comprises a control signal for controlling a terminal device of the second group of terminal devices to enter the connected mode, and wherein in the connected mode, the predetermined signalling comprises a scheduling signal for scheduling radio resources for use by a terminal device of the second group of terminal devices.

3. A wireless telecommunications system according to clause 2, wherein the base station is operable to store an identifier of the group that each terminal device in the first and second groups of terminal devices belongs to and to transmit a control signal to a terminal device for controlling the terminal device to enter the connected mode via the network node associated with the group to which the terminal device belongs, the control signal being transmitted to the network node associated with the group to which the terminal device belongs on the basis of the stored identifier of the group to which the terminal device belongs.

4. A wireless telecommunications system according to clause 1, wherein the network node is a relay node.

5. A wireless telecommunications system according to clause 1, wherein the network node is a small base station.

6. A terminal device for use with a wireless telecommunications system according to any preceding clause, the terminal device comprising:
    a transceiver operable to exchange signalling with the base station via one of the first and second network nodes; and
    a controller operable to:
    select one of the first and second groups of terminal devices;
    if the first group of terminal devices is selected, control the transceiver to exchange signalling with the base station via the first network node, the controller controlling the transceiver to exchange the predetermined signalling with the first network node during the first wake period of the repeating signalling cycle; and
    if the second group of terminal devices is selected, control the transceiver to exchange signalling with the base station via the second network node, the controller controlling the transceiver to exchange the predetermined signalling with the second network node during the second wake period of the repeating signalling cycle.

7. A terminal device according to clause 6, comprising a storage medium storing information indicative of which of the first and second groups of terminal devices is to be selected, and wherein the controller is operable to select the one of the first and second groups of terminal devices in accordance with the one of the first and second groups of terminal devices indicated by the information stored in the storage medium.

8. A terminal device according to clause 7, wherein the terminal device is the only terminal device in the selected one of the first and second groups of terminal devices, and wherein:
    the transceiver is operable to receive direct signalling from the base station;
    the controller is operable to measure a signal characteristic of direct signalling from the base station received at the transceiver;
    if the measured signal characteristic is greater than or equal to a threshold, then the controller is operable to:
    control the transceiver to directly transmit a registration request message to the base station, the registration request message comprising a request for information indicative of the network node, the repeating signalling cycle, and the one of the first and second wake periods associated with the selected one of the first and second groups of terminal devices, control the transceiver to directly receive an information message indicative of the
    network node, the repeating signalling cycle, and the one of the first and second wake periods associated with the selected one of the first and second groups of terminal devices from the base station, and
    control the transceiver to exchange signalling with the base station via the network node indicated by the received information message, and control the transceiver to exchange the predetermined signalling with the network node indicated by the received information message using the repeating signalling cycle and the one of the first and second wake periods indicated by the received information message; and
    if the measured signal characteristic is less than the threshold, then the controller is operable to:
    control the transceiver to transmit a device to device (D2D) discovery signal for the establishment of a network node to be associated with the selected one of the first and second groups of terminal devices and via which the transceiver is operable to exchange signalling with the base station;
    control the transceiver to transmit a registration request message to the base station via the established network node, the registration request message comprising a request for information indicative of the repeating signalling cycle and the one of the first and second wake periods associated with the selected one of the first and second groups of terminal devices,
    control the transceiver to receive an information message indicative of the repeating signalling cycle and the one of the first and second wake periods associated with the selected one of the first and second groups of terminal devices from the base station via the established network node, and
    control the transceiver to exchange signalling with the base station via the established network node, and control the transceiver to exchange the predetermined signalling with the established network node using the repeating signalling cycle and the one of the first and second wake periods indicated by the received information message.

9. A terminal device according to clause 7, wherein the selected one of the first and second groups of terminal devices comprises at least one other terminal device, and wherein:
    the transceiver is operable to receive direct signalling from at least one of the base station and the network node associated with the selected one of the first and second groups of terminal devices, the direct signalling comprising an information message indicative of the network node, the repeating signalling cycle and the one of the first and second wake periods associated with the selected one of the first and second groups of terminal devices from the base station;
    the controller is operable to control the transceiver to exchange signalling with the base station via the network node indicated by the received information message, and control the transceiver to exchange the predetermined signalling with the network node indicated by the received information message using the repeating signalling cycle and the one of the first and second wake periods indicated by the received information message.

10. A terminal device according to clause 6, wherein:
    the transceiver is operable to receive direct signalling from the base station comprising an information message indicative of the network node, the repeating signalling cycle, and the one of the first and second wake periods associated with each of the first and second groups of terminal devices; and
    the controller is operable to:
    control the transceiver to receive signalling from the network node associated with each of the first and second groups of terminal devices as identified in the received information message;

measure a signal characteristic of the signalling received from each network node;
determine one of the network nodes on the basis of the measured signal characteristic of the signalling received from each network node; and
control the transceiver to exchange signalling with the base station via the determined network node, and control the transceiver to exchange the predetermined signalling with the determined network node using the repeating signalling cycle and the one of the first and second wake periods associated with the group of terminal devices associated with the determined network node.

11. A terminal device according to clause 6, wherein:
the transceiver is operable to receive signalling from the network node associated with one of the first and second groups of terminal devices, the signalling comprising an information message indicative of the network node, the repeating signalling cycle and the one of the first and second wake up periods associated with the group of terminal devices associated with the network node; and
the controller is operable to:
control the transceiver to exchange signalling with the base station via the network node from which the information message is received, and control the transceiver to exchange the predetermined signalling with the network node from which the information message is received using the repeating signalling cycle and the one of the first and second wake periods associated with the group of terminal devices associated with the network node from which the information message is received.

12. A terminal device according to clause 6, wherein:
the controller is operable to:
control the transceiver to directly transmit a registration request message to the base station, the registration request message comprising a request for information indicative of a network node, a repeating signalling cycle, and the one of the first and second wake periods for establishing one of the first and second groups of terminal devices;
control the transceiver to directly receive an information message from the base station, the information message being indicative of a network node, a repeating signalling cycle, and the one of the first and second wake periods for establishing one of the first and second groups of terminal devices, and
control the transceiver to exchange signalling with the base station via the network node indicated by the received information message, and control the transceiver the predetermined signalling with the network node indicated by the received information message using the repeating signalling cycle and the one of the first and second wake periods indicated by the received information message.

13. A terminal device according to any one of clauses 10 to 12, wherein:
the controller is operable to:
measure a signal characteristic of signalling received from the network node via which the transceiver exchanges signalling with the base station; and
if the measured signal characteristic falls below a predetermined threshold, perform a reset process in which the transceiver is controlled to exchange signalling with the base station via the network node associated with a different one of the first and second groups of terminal devices, and control the transceiver to exchange the predetermined signalling with network node associated with the different one of the first and second groups of terminal devices using the repeating signalling cycle and the one of the first and second wake periods associated with the different one of the first and second groups of terminal devices.

14. A base station for use in a wireless telecommunications system according to any one of clauses 1 to 5, the base station comprising:
a transceiver operable to exchange signalling with the first group of terminal devices via the first network node and to exchange signalling with the second group of terminal devices via the second network node; and
a controller operable to:
assign the repeating signalling signal and first wake period to the first network node and control the transceiver to transmit signalling identifying the repeating signalling cycle and first wake period to the first network node; and
assign the repeating signalling cycle and second wake period to the second network node and control the transceiver to transmit signalling identifying the repeating signalling cycle and second wake period to the second network node.

15. A terminal device for use as a network node in a wireless telecommunications system according to any one of clauses 1 to 5, the terminal device comprising:
a transceiver;
a controller operable to:
control the transceiver to receive signalling comprising a message identifying one of the first and second groups of terminal devices, the repeating signalling cycle and one of the first and second wake periods from the base station;
control the transceiver to receive signalling from the identified one of the first and second groups of terminal devices and control the transceiver to transmit the received signalling to the base station;
control the transceiver to receive signalling from the base station and control the transceiver to transmit the received signalling to identified one of the first and second groups of terminal devices; and
control the transceiver to exchange the predetermined signalling with the identified one of the first and second groups of terminal devices using the identified repeating signalling cycle and the identified one of the first and second wake periods.

16. A method of operating a wireless telecommunications system comprising a plurality of terminal devices operable to communicate with a base station via respective network nodes, wherein the plurality of terminal devices comprises a first group of terminal devices operable to communicate with the base station via a first network node and a second group of terminal devices operable to communicate with the base station via a second network node, the method comprising synchronising each of the first and second groups of terminal devices to communicate with the first and second network nodes, respectively, in a discontinuous mode comprising a repeating signalling cycle, the repeating signalling cycle comprising a first wake period and a second wake period; wherein:
the first wake period is a first portion of the repeating signalling cycle and the start of the first wake period is defined by a first offset value relative to the start of the repeating signalling cycle;

the second wake period is a second portion of the repeating signalling cycle and the start of the second wake period is defined by a second offset value relative to the start of the repeating signalling cycle, the second offset value being different to the first offset value;

each terminal device in the first group of terminal devices exchanges predetermined signalling with the first network node during the first wake period of the repeating signalling cycle, and does not exchange the predetermined signalling with the first network node during a portion of the repeating signalling cycle other than the first wake period; and each terminal device in the second group of terminal devices exchanges predetermined signalling with the second network node during the second wake period of the repeating signalling cycle, and does not exchange the predetermined signalling with the second network node during a portion of the repeating signalling cycle other than the second wake period.

17. A method of operating a terminal device for use with a wireless telecommunications system according to any one of clauses 1 to 5, the terminal device comprising a transceiver operable to exchange signalling with the base station via one of the first and second network nodes, wherein the method comprises:

selecting one of the first and second groups of terminal devices;

if the first group of terminal devices is selected, controlling the transceiver to exchange signalling with the base station via the first network node, and controlling the transceiver to exchange the predetermined signalling with the first network node during the first wake period of the repeating signalling cycle; and if the second group of terminal devices is selected, controlling the transceiver to exchange signalling with the base station via the second network node, and controlling the transceiver to exchange the predetermined signalling with the second network node during the second wake period of the repeating signalling cycle.

18. A method of operating a base station for use in a wireless telecommunications system according to any one of clauses 1 to 5, the base station comprising a transceiver operable to exchange signalling with the first group of terminal devices via the first network node and to exchange signalling with the second group of terminal devices via the second network node, wherein the method comprises:

assigning the repeating signalling signal and first wake period to the first network node and controlling the transceiver to transmit signalling identifying the repeating signalling cycle and first wake period to the first network node; and assigning the repeating signalling cycle and second wake period to the second network node and controlling the transceiver to transmit signalling identifying the repeating signalling cycle and second wake period to the second network node.

19. A method of operating a terminal device for use as a network node in a wireless telecommunications system according to any one of clauses 1 to 5, the terminal device comprising a transceiver, wherein the method comprises:

controlling the transceiver to receive signalling comprising a message identifying one of the first and second groups of terminal devices, the repeating signalling cycle and one of the first and second wake periods from the base station;

controlling the transceiver to receive signalling from the identified one of the first and second groups of terminal devices and controlling the transceiver to transmit the received signalling to the base station;

controlling the transceiver to receive signalling from the base station and controlling the transceiver to transmit the received signalling to identified one of the first and second groups of terminal devices; and controlling the transceiver to exchange the predetermined signalling with the identified one of the first and second groups of terminal devices using the identified repeating signalling cycle and the identified one of the first and second wake periods.

20. A terminal device for use with a wireless telecommunications system according to any one of clauses 1 to 5, the terminal device comprising:

transceiver circuitry operable to exchange signalling with the base station via one of the first and second network nodes; and controller circuitry operable to:

select one of the first and second groups of terminal devices;

if the first group of terminal devices is selected, control the transceiver circuitry to exchange signalling with the base station via the first network node, the controller circuitry controlling the transceiver circuitry to exchange the predetermined signalling with the first network node during the first wake period of the repeating signalling cycle; and if the second group of terminal devices is selected, control the transceiver circuitry to exchange signalling with the base station via the second network node, the controller circuitry controlling the transceiver circuitry to exchange the predetermined signalling with the second network node during the second wake period of the repeating signalling cycle.

21. A base station for use in a wireless telecommunications system according to any one of clauses 1 to 5, the base station comprising:

transceiver circuitry operable to exchange signalling with the first group of terminal devices via the first network node and to exchange signalling with the second group of terminal devices via the second network node; and controller circuitry operable to:

assign the repeating signalling signal and first wake period to the first network node and control the transceiver circuitry to transmit signalling identifying the repeating signalling cycle and first wake period to the first network node; and assign the repeating signalling cycle and second wake period to the second network node and control the transceiver circuitry to transmit signalling identifying the repeating signalling cycle and second wake period to the second network node.

22. A terminal device for use as a network node in a wireless telecommunications system according to any one of clauses 1 to 5, the terminal device comprising:

transceiver circuitry;

controller circuitry operable to:

control the transceiver circuitry to receive signalling comprising a message identifying one of the first and second groups of terminal devices, the repeating signalling cycle and one of the first and second wake periods from the base station;

control the transceiver circuitry to receive signalling from the identified one of the first and second groups of terminal devices and control the transceiver circuitry to transmit the received signalling to the base station;

control the transceiver circuitry to receive signalling from the base station and control the transceiver circuitry to transmit the received signalling to identified one of the first and second groups of terminal devices; and control the transceiver circuitry to exchange the predetermined signalling with the identified one of the first and second groups of terminal devices using the identified repeating signalling cycle and the identified one of the first and second wake periods.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Annex 1

The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink communications channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an base station to UEs being served by the base station. For example, a number of resource blocks of the PDSCH may be allocated to a UE in order that it may receive data that it has previously requested or data which is being pushed to it by the base station, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Each uplink subframe may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the base station for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the base station. Further information on the structure and functioning of the physical channels of LTE systems can be found in [1].

In an analogous manner to the resources of the PDSCH, resources of the PUSCH are required to be scheduled or granted by the serving base station and thus if data is to be transmitted by a UE, resources of the PUSCH are required to be granted to the UE by the base station. At a UE, PUSCH resource allocation is achieved by the transmission of a scheduling request or a buffer status report to its serving base station. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the base station is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the base station and gives the base station information regarding the amount of data in an uplink buffer or buffers at the UE. After receiving the buffer status report, the base station can allocate a portion of the PUSCH resources to the sending UE in order to transmit some of its buffered uplink data and then inform the UE of the resource allocation via a DCI in the PDCCH. For example, presuming a UE has a connection with the base station, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating base station, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an base station is required if UEs, even when in close proximity, wish to communicate with one another. These limitations may be problematic when the system is experiencing high load or base station coverage is not available, for instance in remote areas or when base stations are not functioning correctly. Overcoming these limitations may increase both the capacity and efficiency of LTE networks but also lead to the creations of new revenue possibilities for LTE network operators.

REFERENCES

[1] LTE for UMTS: OFDMA and SC-FDMA Based Radio Access, Harris Holma and Antti Toskala, Wiley 2009, ISBN 978-0-470-99401-6.

[2] Rel-13 Work Item proposal RP-150493 "RAN enhancements for extended DRX in LTE" from Qualcomm Incorporated, 3GPP TSG RAN Meeting #67, Shanghai, China, 9-12 March 2015.

[3] 3GPP TS 36.321 V12.6.0 (2015-06).

The invention claimed is:

1. A wireless telecommunications system comprising a plurality of terminal devices operable to communicate with a base station via respective network nodes, wherein the plurality of terminal devices comprises a first group of terminal devices operable to communicate with the base station via a first network node and a second group of terminal devices operable to communicate with the base station via a second network node, wherein each of the first and second groups of terminal devices are synchronised to communicate with the first and second network nodes, respectively, in a discontinuous mode comprising a repeating signalling cycle, the repeating signalling cycle comprising a first wake period and a second wake period; wherein:

the first wake period is a first portion of the repeating signalling cycle and the start of the first wake period is defined by a first offset value relative to the start of the repeating signalling cycle;

the second wake period is a second portion of the repeating signalling cycle and the start of the second wake period is defined by a second offset value relative to the start of the repeating signalling cycle, the second offset value being different to the first offset value;

each terminal device in the first group of terminal devices is operable to exchange predetermined signalling with the first network node during the first wake period of the repeating signalling cycle, and to not exchange the predetermined signalling with the first network node during a portion of the repeating signalling cycle other than the first wake period; and each terminal device in the second group of terminal devices is operable to exchange predetermined signalling with the second network node during the second wake period of the repeating signalling cycle, and to not exchange the predetermined signalling with the second network node during a portion of the repeating signalling cycle other than the second wake period, wherein the discontinuous mode of the first group of terminal devices is one of an idle mode or a connected mode, wherein in the idle mode, the predetermined signalling comprises a control signal for controlling a terminal device of the first group of terminal devices to enter the connected mode, and wherein in the connected mode, the predetermined signalling comprises a scheduling signal for scheduling radio resources for use by a terminal device of the first group of terminal devices, and wherein the discontinuous mode of the second group of terminal devices is one of an idle mode or a connected mode, wherein in the idle mode, the predetermined signalling comprises a control signal for controlling a terminal device of the second group of terminal devices to enter the connected mode, and wherein in the connected mode, the predetermined signalling comprises a scheduling signal for scheduling radio resources for use by a terminal device of the second group of terminal devices.

2. A wireless telecommunications system according to claim 1, wherein the base station is operable to store an identifier of the group that each terminal device in the first and second groups of terminal devices belongs to and to transmit a control signal to a terminal device for controlling the terminal device to enter the connected mode via the network node associated with the group to which the terminal device belongs, the control signal being transmitted to the network node associated with the group to which the terminal device belongs on the basis of the stored identifier of the group to which the terminal device belongs.

3. A wireless telecommunications system according to claim 1, wherein the network node is a relay node.

4. A wireless telecommunications system according to claim 1, wherein the network node is a small base station.

5. A first terminal device among a plurality of terminal devices operating within a wireless telecommunications system and operable to communicate with a base station via respective network nodes, wherein the plurality of terminal devices comprises a first group of terminal devices operable to communicate with the base station via a first network node and a second group of terminal devices operable to communicate with the base station via a second network node, wherein each of the first and second groups of terminal devices are synchronised to communicate with the first and second network nodes, respectively, in a discontinuous mode comprising a repeating signalling cycle, the repeating signalling cycle comprising a first wake period and a second wake period, the first terminal device comprising:
 a transceiver operable to exchange signalling with the base station via one of the first and second network nodes; and
 a controller operable to:
 select one of the first and second groups of terminal devices;
 when the first group of terminal devices is selected, control the transceiver to exchange signalling with the base station via the first network node, the controller controlling the transceiver to exchange the predetermined signalling with the first network node during the first wake period of the repeating signalling cycle; and
 when the second group of terminal devices is selected, control the transceiver to exchange signalling with the base station via the second network node, the controller controlling the transceiver to exchange the predetermined signalling with the second network node during the second wake period of the repeating signalling cycle.

6. A first terminal device according to claim 5, comprising a storage medium storing information indicative of which of the first and second groups of terminal devices is to be selected, and wherein the controller is operable to select the one of the first and second groups of terminal devices in accordance with the one of the first and second groups of terminal devices indicated by the information stored in the storage medium.

7. A first terminal device according to claim 6, wherein the first terminal device is the only terminal device in the selected one of the first and second groups of terminal devices, and wherein:
 the transceiver is operable to receive direct signalling from the base station;
 the controller is operable to measure a signal characteristic of direct signalling from the base station received at the transceiver;
 when the measured signal characteristic is greater than or equal to a threshold, then the controller is operable to:
 control the transceiver to directly transmit a registration request message to the base station, the registration request message comprising a request for information indicative of the network node, the repeating signalling cycle, and the one of the first and second wake periods associated with the selected one of the first and second groups of terminal devices,
 control the transceiver to directly receive an information message indicative of the network node, the repeating signalling cycle, and the one of the first and second wake periods associated with the selected one of the first and second groups of terminal devices from the base station, and
 control the transceiver to exchange signalling with the base station via the network node indicated by the received information message, and control the transceiver to exchange the predetermined signalling with the network node indicated by the received information message using the repeating signalling cycle and the one of the first and second wake periods indicated by the received information message; and
 when the measured signal characteristic is less than the threshold, then the controller is operable to:
 control the transceiver to transmit a device to device (D2D) discovery signal for the establishment of a network node to be associated with the selected one of the first and second groups of terminal devices and via which the transceiver is operable to exchange signalling with the base station;
 control the transceiver to transmit a registration request message to the base station via the established network node, the registration request message comprising a request for information indicative of the repeating signalling cycle and the one of the first and second wake periods associated with the selected one of the first and second groups of terminal devices,
 control the transceiver to receive an information message indicative of the repeating signalling cycle and the one of the first and second wake periods associated with the selected one of the first and second groups of terminal devices from the base station via the established network node, and
 control the transceiver to exchange signalling with the base station via the established network node, and control the transceiver to exchange the predetermined signalling with the established network node using the repeating signalling cycle and the one of the first and second wake periods indicated by the received information message.

8. A terminal device according to claim 6, wherein the selected one of the first and second groups of terminal devices comprises at least one other terminal device, and wherein:
 the transceiver is operable to receive direct signalling from at least one of the base station and the network node associated with the selected one of the first and second groups of terminal devices, the direct signalling comprising an information message indicative of the network node, the repeating signalling cycle and the one of the first and second wake periods associated with the selected one of the first and second groups of terminal devices from the base station;
 the controller is operable to control the transceiver to exchange signalling with the base station via the network node indicated by the received information message and control the transceiver to exchange the predetermined signalling with the network node indicated by the received information message using the repeating signalling cycle and the one of the first and second wake periods indicated by the received information message.

9. A terminal device according to claim 5, wherein:
the transceiver is operable to receive direct signalling from the base station comprising an information message indicative of the network node, the repeating signalling cycle, and the one of the first and second wake periods associated with each of the first and second groups of terminal devices; and
the controller is operable to:
control the transceiver to receive signalling from the network node associated with each of the first and second groups of terminal devices as identified in the received information message;
measure a signal characteristic of the signalling received from each network node;
determine one of the network nodes on the basis of the measured signal characteristic of the signalling received from each network node; and
control the transceiver to exchange signalling with the base station via the determined network node, and control the transceiver to exchange the predetermined signalling with the determined network node using the repeating signalling cycle and the one of the first and second wake periods associated with the group of terminal devices associated with the determined network node.

10. A first terminal device according to claim 9, wherein:
the controller is operable to:
measure a signal characteristic of signalling received from the network node via which the transceiver exchanges signalling with the base station; and
when the measured signal characteristic falls below a predetermined threshold, perform a reset process in which the transceiver is controlled to exchange signalling with the base station via the network node associated with a different one of the first and second groups of terminal devices, and control the transceiver to exchange the predetermined signalling with network node associated with the different one of the first and second groups of terminal devices using the repeating signalling cycle and the one of the first and second wake periods associated with the different one of the first and second groups of terminal devices.

11. A first terminal device according to claim 5, wherein:
the transceiver is operable to receive signalling from the network node associated with one of the first and second groups of terminal devices, the signalling comprising an information message indicative of the network node, the repeating signalling cycle and the one of the first and second wake up periods associated with the group of terminal devices associated with the network node; and
the controller is operable to:
control the transceiver to exchange signalling with the base station via the network node from which the information message is received, and control the transceiver to exchange the predetermined signalling with the network node from which the information message is received using the repeating signalling cycle and the one of the first and second wake periods associated with the group of terminal devices associated with the network node from which the information message is received.

12. A first terminal device according to claim 5, wherein:
the controller is operable to:
control the transceiver to directly transmit a registration request message to the base station, the registration request message comprising a request for information indicative of a network node, a repeating signalling cycle, and the one of the first and second wake periods for establishing one of the first and second groups of terminal devices;
control the transceiver to directly receive an information message from the base station, the information message being indicative of a network node, a repeating signalling cycle, and the one of the first and second wake periods for establishing one of the first and second groups of terminal devices, and
control the transceiver to exchange signalling with the base station via the network node indicated by the received information message, and control the transceiver the predetermined signalling with the network node indicated by the received information message using the repeating signalling cycle and the one of the first and second wake periods indicated by the received information message.

13. A first terminal device operating as a network node within a wireless telecommunications system and operable to communicate with a base station and a plurality of terminal devices, wherein the plurality of terminal devices comprises a first group of terminal devices operable to communicate with the base station via a first network node and a second group of terminal devices operable to communicate with the base station via a second network node, wherein each of the first and second groups of terminal devices are synchronised to communicate with the first and second network nodes, respectively, in a discontinuous mode comprising a repeating signalling cycle, the repeating signalling cycle comprising a first wake period and a second wake period, the first terminal device comprising:
a transceiver;
a controller operable to:
control the transceiver to receive signalling comprising a message identifying one of the first and second groups of terminal devices, the repeating signalling cycle and one of the first and second wake periods from the base station;
control the transceiver to receive signalling from the identified one of the first and second groups of terminal devices and control the transceiver to transmit the received signalling to the base station;
control the transceiver to receive signalling from the base station and control the transceiver to transmit the received signalling to identified one of the first and second groups of terminal devices; and
control the transceiver to exchange the predetermined signalling with the identified one of the first and second groups of terminal devices using the identified repeating signalling cycle and the identified one of the first and second wake periods.

14. A method of operating a first terminal device among a plurality of terminal devices operating within a wireless telecommunications system and operable to communicate with a base station via respective network nodes, wherein the plurality of terminal devices comprises a first group of terminal devices operable to communicate with the base station via a first network node and a second group of terminal devices operable to communicate with the base station via a second network node, wherein each of the first and second groups of terminal devices are synchronised to communicate with the first and second network nodes, respectively, in a discontinuous mode comprising a repeating signalling cycle, the repeating signalling cycle comprising a first wake period and a second wake period, the first terminal device comprising a transceiver operable to exchange signalling with the base station via one of the first and second network nodes, wherein the method comprises:
selecting one of the first and second groups of terminal devices;
when the first group of terminal devices is selected, controlling the transceiver to exchange signalling with the base station via the first network node, and controlling the transceiver to exchange the predetermined signalling with the first network node during the first wake period of the repeating signalling cycle; and
when the second group of terminal devices is selected, controlling the transceiver to exchange signalling with the base station via the second network node, and controlling the transceiver to exchange the predetermined signalling with the second network node during the second wake period of the repeating signalling cycle.

15. A method of operating a terminal device operating as a network node within a wireless telecommunications system and operable to communicate with a base station and a plurality of terminal devices, wherein the plurality of terminal devices comprises a first group of terminal devices operable to communicate with the base station via a first network node and a second group of terminal devices operable to communicate with the base station via a second network node, wherein each of the first and second groups of terminal devices are synchronised to communicate with the first and second network nodes, respectively, in a discontinuous mode comprising a repeating signalling cycle, the repeating signalling cycle comprising a first wake period and a second wake period, the first terminal device comprising a transceiver, wherein the method comprises:
controlling the transceiver to receive signalling comprising a message identifying one of the first and second groups of terminal devices, the repeating signalling cycle and one of the first and second wake periods from the base station;
controlling the transceiver to receive signalling from the identified one of the first and second groups of terminal devices and controlling the transceiver to transmit the received signalling to the base station;
controlling the transceiver to receive signalling from the base station and controlling the transceiver to transmit the received signalling to identified one of the first and second groups of terminal devices; and
controlling the transceiver to exchange the predetermined signalling with the identified one of the first and second groups of terminal devices using the identified repeating signalling cycle and the identified one of the first and second wake periods.

16. A first terminal device among a plurality of terminal devices operating within a wireless telecommunications system and operable to communicate with a base station via respective network nodes, wherein the plurality of terminal devices comprises a first group of terminal devices operable to communicate with the base station via a first network node and a second group of terminal devices operable to communicate with the base station via a second network node, wherein each of the first and second groups of terminal devices are synchronised to communicate with the first and second network nodes, respectively, in a discontinuous mode comprising a repeating signalling cycle, the repeating signalling cycle comprising a first wake period and a second wake period, the first terminal device comprising:
transceiver circuitry operable to exchange signalling with the base station via one of the first and second network nodes; and
controller circuitry operable to:
select one of the first and second groups of terminal devices;
when the first group of terminal devices is selected, control the transceiver circuitry to exchange signalling with the base station via the first network node, the controller circuitry controlling the transceiver circuitry to exchange the predetermined signalling with the first network node during the first wake period of the repeating signalling cycle; and
when the second group of terminal devices is selected, control the transceiver circuitry to exchange signalling with the base station via the second network node, the controller circuitry controlling the transceiver circuitry to exchange the predetermined signalling with the second network node during the second wake period of the repeating signalling cycle.

17. A first terminal device operating as a network node within a wireless telecommunications system and operable to communicate with a base station and a plurality of terminal devices, wherein the plurality of terminal devices comprises a first group of terminal devices operable to communicate with the base station via a first network node and a second group of terminal devices operable to communicate with the base station via a second network node, wherein each of the first and second groups of terminal devices are synchronised to communicate with the first and second network nodes, respectively, in a discontinuous mode comprising a repeating signalling cycle, the repeating signalling cycle comprising a first wake period and a second wake period, the first terminal device comprising:
transceiver circuitry;
controller circuitry operable to:
control the transceiver circuitry to receive signalling comprising a message identifying one of the first and second groups of terminal devices, the repeating signalling cycle and one of the first and second wake periods from the base station;
control the transceiver circuitry to receive signalling from the identified one of the first and second groups of terminal devices and control the transceiver circuitry to transmit the received signalling to the base station;
control the transceiver circuitry to receive signalling from the base station and control the transceiver circuitry to transmit the received signalling to identified one of the first and second groups of terminal devices; and
control the transceiver circuitry to exchange the predetermined signalling with the identified one of the first and second groups of terminal devices using the identified repeating signalling cycle and the identified one of the first and second wake periods.

* * * * *